(12) United States Patent
Worth et al.

(10) Patent No.: US 11,079,921 B1
(45) Date of Patent: Aug. 3, 2021

(54) TOOL SELECTION SYSTEMS

(71) Applicant: Caterpillar Inc., Peoria, IL (US)

(72) Inventors: David Michael Worth, Naperville, IL (US); James B. Fairgrieve, North Aurora, IL (US); Amit Kashyap, Elgin, IL (US); John P. Marek, Saint Charles, IL (US); Yihong Yang, Champaign, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 16/805,532

(22) Filed: Feb. 28, 2020

(51) Int. Cl.
| | |
|---|---|
| *G06F 3/048* | (2013.01) |
| *G06F 3/0484* | (2013.01) |
| *G06F 3/0482* | (2013.01) |
| *G06F 3/0483* | (2013.01) |
| *G06Q 30/06* | (2012.01) |

(52) U.S. Cl.
CPC ........ *G06F 3/04847* (2013.01); *G06F 3/0482* (2013.01); *G06F 3/0483* (2013.01); *G06Q 30/0611* (2013.01)

(58) Field of Classification Search
CPC ... G06F 3/0482; G06F 3/0483; G06F 3/04847
See application file for complete search history.

(56) References Cited

U.S. PATENT DOCUMENTS

| | | | |
|---|---|---|---|
| 7,171,344 | B2 | 1/2007 | Lind |
| 7,684,891 | B2 | 3/2010 | Okrongli et al. |
| 10,061,297 | B2 | 8/2018 | Karl et al. |
| 2008/0262947 | A1* | 10/2008 | Buzzell ............. G06Q 30/0623 705/26.8 |
| 2009/0138139 | A1 | 5/2009 | Tsai et al. |
| 2011/0030459 | A1* | 2/2011 | Tragesser ............... G01M 1/12 73/65.01 |
| 2014/0122162 | A1* | 5/2014 | Baker .................... G06Q 50/02 705/7.27 |
| 2016/0364683 | A1* | 12/2016 | Lyons ................. G06Q 30/018 |
| 2018/0179732 | A1* | 6/2018 | Bartsch ................... E02F 9/262 |

FOREIGN PATENT DOCUMENTS

| | | |
|---|---|---|
| JP | 2003141179 A | 5/2003 |
| JP | 2003173205 A | 6/2003 |
| JP | 2007079908 A | 3/2007 |

* cited by examiner

*Primary Examiner* — Claudia Dragoescu
(74) *Attorney, Agent, or Firm* — Lee & Hayes, PLLC

(57) ABSTRACT

A method includes, with a processor executing computer-readable instructions stored within a memory device, displaying, on a display device and via at least one graphical user interface (GUI), a first interface element associated with a machine selection, receiving, via the first interface element, a first input comprising an indication of a machine, displaying, on the display device and via the at least one GUI, one or more second interface elements associated with tool parameters, receiving, via the second interface element, a second input comprising an indication of the tool parameters, determining, based at least in part on the machine and the tool parameters, one or more tools for use with the machine, and presenting, via the at least one GUI, a graphical representation of the one or more tools.

20 Claims, 11 Drawing Sheets

TOOL SELECTION SYSTEMS

TECHNICAL FIELD

The present disclosure relates to tools for machines, and more particularly, to a system and method for selecting a tool based on a fitness of the tool with a particular machine.

BACKGROUND

Digging machines such as loading machines, excavators, backhoes, dozers, drilling machines, trenchers, and drag lines, among other digging machines load a work tool, such as a bucket, with material. The work tool is coupled to and actuated by the digging machine, and the loading is achieved by approaching the pile of material or material face and digging into the material such that the material is moved into the bucket or a similar work tool. In some instances, a tool is fitted to the digging machine at the time of manufacturing or as a replacement tool for a worn tool.

The selection of a tool to fit with the digging machine may involve interacting with sales representatives, engineers, marketing professionals, and/or dealers to determine an appropriate tool. Further, dealer and customer requests, custom quotes, technical specification sheets, quote restructuring and approvals, and other clerical work increase the time and cost associated with the tool selection process. Still further, the tool may have incorrect specifications, such as load ratings, sizes, dimensions, or payload size, for the particular machine on which the tool is to be coupled, such that the tool is not compatible with or fit for the particular machine. Even further, the tool may include incorrect wear parts applied to the tool based on the intended use of the tool. These challenges may result in lost time and increased costs associated with the tool selection process, less than optimum tool selection for the end user, and/or reduced profits for the tool manufacture and/or dealer.

Japanese Patent Application No. 2003141179 A (hereinafter referred to as the '179 reference) describes an example system for use in displaying a product order, a manufacturing device, and an ordered product. In particular, the '179 reference describes a system and a method for presenting a total image of a product of for which the cost is changed, and which is three-dimensionally confirmed on a display screen when ordering the product.

The '179 reference, however, does not describe determining fitness of a component such as a tool with specified machinery or considering the use or application of the tool or parameters of the tool. Further, the '179 reference does not describe presenting to a user a comparison of a plurality of tools that fit the machine based on the above considerations. The system of the '179 reference, however, may result in sub-optimal pairing of tools and machines, and/or may require unnecessary work or cost to pair tools with machines.

Examples of the present disclosure are directed toward overcoming the deficiencies described above.

SUMMARY

In an example of the present disclosure, a method includes, with a processor executing computer-readable instructions stored within a memory device, displaying, on a display device and via at least one graphical user interface (GUI), a first interface element associated with a machine selection, receiving, via the first interface element, a first input comprising an indication of a machine, displaying, on the display device and via the at least one GUI, one or more second interface elements associated with tool parameters, receiving, via the second interface element, a second input comprising an indication of the tool parameters, determining, based at least in part on the machine and the tool parameters, one or more tools for use with the machine, and presenting, via the at least one GUI, a graphical representation of the one or more tools.

In another example of the present disclosure, one or more non-transitory computer readable media store instructions that, when executed by one or more processors, configure a computing device to perform operation including, receiving a first input defining at least one tool parameter of a tool to be coupled to a machine, receiving a second input defining at least one machine parameter of the machine, the machine and the tool defining a machine system, and determining, based on the at least the tool parameter and the at least one machine parameter, a plurality of candidate tools. The computer usable program code, when executed by the one or more processors, presents, via at least one GUI, the plurality of candidate tools and the tool parameter of each candidate tool of the plurality of candidate tools in comparison, and determines a fitness of the machine system corresponding to each candidate tool within the machine system. The fitness of the machine system defines a suitability of each candidate tool with the machine based on a level of compatibility. The computer usable program code, when executed by the one or more processors, presents, via the at least one GUI, an indicator of the fitness of the machine system corresponding to each candidate tool.

In yet another example of the present disclosure, a system includes a processor, and a data storage device communicatively coupled to the processor to store computer usable program code. The computer usable program code, when executed by the processor, presents a graphical user interface (GUI) including a tool selection tab, a wear part selection tab, and a machine matching tab. Further, the computer usable program code, when executed by the processor, receives, via the tool selection tab, a first input defining at least one tool parameter of the tool to be coupled to a machine, and receives, via the tool selection tab, a second input defining at least one machine parameter of the machine. The machine and the tool define a machine system. Further, the computer usable program code, when executed by the processor, receives, via the wear part selection tab, a third input defining at least one wear part parameter of a wear part to be coupled to the tool, presents, via the machine matching tab, an indicator of a fitness of the machine system, and presents, via the GUI, a plurality of candidate tools based on the first input, the second input, and the third input.

DETAILED DESCRIPTION

Figure 1:
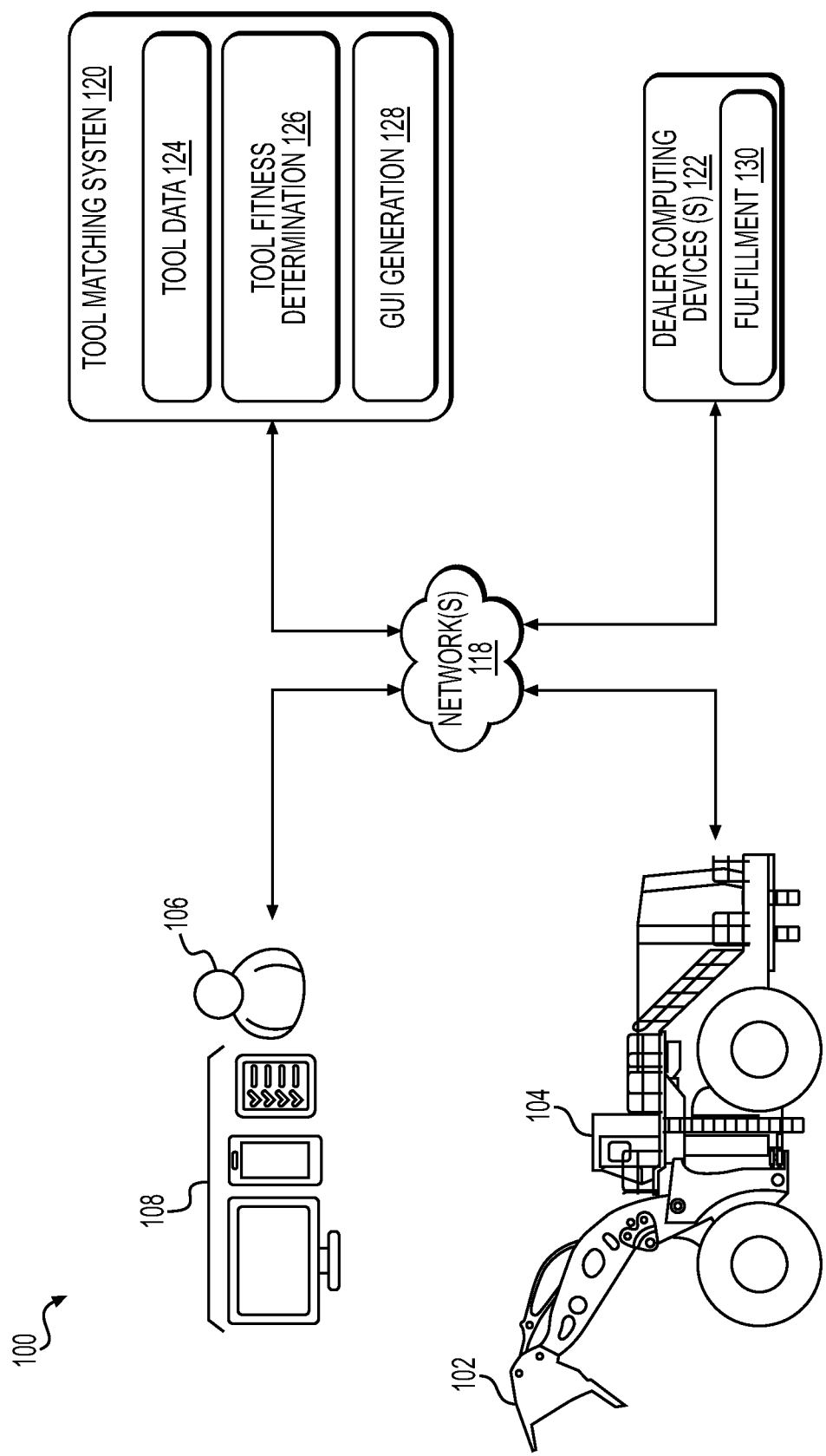
FIG. 1 is a schematic illustration of an exemplary environment for a tool ordering process using a graphical user interface (GUI) described herein, according to aspects of this disclosure.

Wherever possible, the same reference numbers will be used throughout the drawings to refer to the same or like parts.

In overcoming the deficiencies described above, FIG. 1 is a schematic illustration of an exemplary environment or system 100 for a tool ordering process using a graphical user interface (GUI) described herein, according to aspects of this disclosure. Components of the environment 100 interact with each other to enable a user 106, such as a purchaser, to easily order a tool 102 for a machine 104 such as a loading machine. The machine 104 is one of any of a variety of machines, but generally includes a machine having one or more parts, including a tool 102, that are susceptible to wear, resulting from forces acting on such parts during operation of the machine 104. Thus, the tool 102 and other parts are replaced over time as a result of such wear. The machine 104 is illustrated as a loading machine which includes ground engagement tools (GET) secured proximate to a lip of the tool 102 such as a bucket. Although FIG. 1 uses a loading machine as the machine 104 and a bucket as the tool 102, other examples are contemplated. For example, and without limitation, the machine 104 represents a work machine, such as a track-type tractor, a wheel loader, a generator set, an oil drill, or any other type of machine that performs an intensive work task. In addition to or instead of the illustrated bucket, the work machines include other high-stress parts including tracks made of individual track links, blades having edges for moving materials, and/or other parts that wear over time as the machine is used to perform various tasks. Other examples of the machine 104 include an industrial transport machine, such as a locomotive, a haul truck, a bus, an aircraft, or other such machine that moves people or payloads. The machine 104 may also embody a vehicle, such as a passenger truck or car. Such machines also have high-stress parts, such as axles or tires, that wear with use and may eventually need replacing. In still further implementations, the machine 104 is a work tool, such as a saw or drill having one or more parts, such as teeth or bits, that wear over time with use. In this disclosure, parts of the machine 104 that are subject to stresses that cause such parts to wear over time and with use, are referred to as "wear parts." Techniques described herein can determine wear of such wear parts.

The user 106 is any person or entity associated with the machine 104. By way of nonlimiting example, the user 106 is an owner, a customer, an operator, a technician, a repair person, a customer service representative, dealer personnel, or any other person concerned with the machine 104. As noted above, and explained in more detail herein, the user 106 utilizes the systems and methods described herein to order a tool 102 and/or associated parts via a GUI that correctly fits the user's machine 104 and intended use of the machine 104 and tool 102.

The computing device(s) 108 depicted in FIG. 1 may be a mobile device carried by or otherwise accessible to the user 106. In the examples described herein, the computing device(s) 108 may be embodied as a smartphone, a mobile phone, a tablet computer, a personal digital assistant (PDA), a network-enabled camera or sensor, a desktop computer, a laptop computer, a handheld device, a mobile device, a gaming system, among other electronic devices or other computing devices. Moreover, and as described herein, the computing device(s) 108 include functionality to assist a user to visually confirm the purchase of a tool 102 and/or wear parts and be provided a number of metrics to the user to confirm that the tool 102 is compatible with the machine 104.

As also illustrated in FIG. 1, the environment 100 includes one or more data processing or tool matching systems 120 and one or more dealer computing device(s) 122. As illustrated, the data processing system(s) 120 and the dealer computing device(s) 122 are configured to communicate with one or more of the machine 104 and/or the computing device(s) 108 via the network(s) 118. Although the data processing system(s) 120 and the dealer computing devices 122 are shown as separate from each other, as well as from the machine 104, and the computing device(s) 108, in some examples, functionality of one or more of these components are carried out over fewer devices. For example, the computing device(s) 108 include some or all functionality of the data processing system(s) 120. Moreover, functionality described herein and ascribe to one or more of the illustrated components are further be performed by a different one or more of the components and/or by entirely different components.

The data processing system(s) 120 are generally configured to receive user input via at least one GUI and determine a number of tools 102 compatible with the machine 104. As illustrated in FIG. 1, the data processing system(s) 120 can include tool data 124, a tool fitness determination component 126, and a GUI generation component 128.

In examples, the tool data 124 is stored within a memory or data storage device as described herein. The tool data 124 includes any data relating to characteristics of a plurality of tools 102. As used in the present specification and in the appended claims, the terms "tool parameter" or "tool characteristics" is meant to be understood broadly as any parameter, characteristic, dimension, or attribute of a tool 102 as defined herein. The tool parameters include internal and external dimensions of the tools 102, a weight of the tools 102, materials used to build the tools 102, shapes such as depths of the tools 102 and leading or cutting edges of the tools 102, GETs that are compatible with the tools 102, machines 104 and/or linkages with which the tools 102 are compatible, swung loads of the tools 102, and weights of the tools 102 as coupled to the machines 104, among a myriad of additional parameters, characteristics, dimensions, or attributes of the tools 102.

The tool fitness determination component 126 includes computer-readable and/or computer-executable instructions that, when executed by a data processing device, causes the computing device(s) 108, the data processing systems 120, and/or the dealer computing device(s) 122 to determine a number of candidate tools based on a number of user inputs. For example, the user inputs a machine 104 such as a model of a machine, an intended use of the tool 102 and/or machine 104, a number of types and shapes of the tool 102, a number of types and shapes of GETs, a volume of the tool 102, and a weight of the tool 102, among a myriad of other parameters. The tool fitness determination component 126 identifies a number of candidate tools as defined by the tool data 124 that fit the parameters input by the user. The tool fitness determination component 126 causes these candidate tools to be presented to a user in a GUI as described herein for selection by the user 106 for customization, order, and/or sale of the selected tool. Further, the tool fitness determination component 126 causes these candidate tools to be presented to a user in a GUI to demonstrate to the user a fitness of the tool 102 with the machine 104 and/or a number of additional machines through visual presentations and/or displayed metrics that define the fitness of the tool 102.

The GUI generation component 128 generates a plurality of tabs, interface elements, graphics, characters, and other GUI elements based on the determinations made via the tool fitness determination component 126. The GUI generation component 128 also presents a plurality of tabs, interface elements, graphics, characters, and other GUI elements that allow the user 106 to input data defining the parameters of the tool 102, the GETs, and/or the machine(s) 104, and present changes based on the input data as described herein. The changes made are based on calculations performed by the tool fitness determination component 126 such as a determination of payloads, weights, swung loads, number of passes, efficiencies, comparisons, and price quotes, among other determinations described herein. Thus, the tool fitness determination component 126 utilizes the tool data 124 and the GUI generation component 128 to present to the user indications of a fitness of the tool selected by the user via the GUI generation component 128 as a candidate tool.

Depending upon the configuration of the environment 100, the data processing system(s) 120 include different roles or different degrees of involvement in carrying out the disclosed techniques. For example, aspects of the environment 100 are configured as a server-based environment or a cloud-based environment that perform the disclosed tool fitness determination as part of the service over the network(s) 118. In such a server- or cloud-based environment, the data processing system(s) 120 (e.g., the server or cloud), receive data from the user 106 via the computing device(s) 108, the tool matching system 120, and/or the dealer computing device(s) 122. In this example, the tool matching system 120 then processes the tool data 124 and any inputs made by the user 106 to match a number of tools 102 with a machine 104 and determine the fitness of the tool 102 for the machine 104 based on the inputs. The tool matching system 120 returns results of the processing to the computing device(s) 108, the tool matching system 120, and/or the dealer computing device(s) 122 over the network(s) 118. Thus, in a server-based or cloud-based environment, the data processing system(s) 120 perform the bulk of the computing operations, while the computing device(s) 108 function as a portal (e.g., via an application or browser) that allows the user 106 to access the services of the data processing system(s) 120 over the network(s) 118. In some examples, the computing device(s) 108 access, e.g., download, a software application that allows the user 106 to access the data processing system(s) 120 and/or two interact with data received from the data processing system(s) 120, as detailed further herein.

The environment 100 also includes the dealer computing device(s) 122, which represents one or more computing systems associated with a dealer that sells or rents tools 102, the machine 104, and/or parts for the machine 104. In one example, the dealer may have a relationship with the user 106. For instance, the user 106 is a customer or potential customer and/or some other individual having an interest in knowing a status of the tool 102 and/or machine 104. In some implementations, the dealer may desire to know when the user 106 is seeking to purchase a new tool 102 including the user-desired parameters of the tool 102, with which machine 104 the user 106 intends to use the tool 102, and for what purposes the user 106 intends to use the tool 102 and/or machine 104, among other knowledge the dealer benefits from. This information provides to the dealer how the dealer serves the user 106 in future purchases and/or understand what tools 102 are in most demand, among other economical and practical information. As with other elements of the environment 100, the dealer computing device(s) 122 includes any number or combination of computing elements enabling communication, storage, and processing to carry out the disclosed techniques. Among other things, the dealer computing device(s) 122 includes a fulfillment component 130, which is configured to assist in the sale of the tool 102, and/or scheduled maintenance associated with the machine 104 and/or tool 102 in response to the data processing system(s) 120 determining the candidate tools. In at least some examples, the dealer computing device(s) 122 also incorporate the data processing system(s) 120. For instance, the dealer computing device(s) 122 is a centralized monitoring and/or service provider capable of determining what tools 102 qualify as candidate tools as well as taking actions, including presenting the candidate tools to the user 106 via, for example, the computing device(s) 108. In at least some examples, the dealer computing device(s) 122 receive notifications, such as emails or text messages, from other elements of the environment, e.g., the data processing system(s) 120 and/or the computing device(s) 108, indicating a number of candidate tools based on the user's inputs. In response to such notifications, the dealer computing device(s) 122 determines, e.g., using the fulfillment component 130, an adequate or appropriate tool 102 and arrange for purchase and/or shipment of the tool 102 to the user 106. In other instances, the dealer computing device(s) 122 provide other instructions to the computing device(s) 108, e.g. providing a user with a quote and/or indication that the tool 102 has been purchased. The dealer computing device(s) 122 also prompt the user, e.g., via a message or other transmission to the computing device(s) 108, to order the tool 102.

In FIG. 1, the network(s) 118 represent any type combination of electronic communication networks configured to communicate data between nodes connected to the network(s) 118. For example, and without limitation, the network(s) 118 represent the Internet, an ethernet, a local-area network, a wide-area network, a personal area network, a cellular network, a telephone network, or any combination thereof. In at least some embodiments, the network(s) 118 include a mobile network and related infrastructure operable to provide Internet connectivity to the computing device(s) 108 such as according to a 2G, 3G, 4G, 5G, and/or LTE communication network.

As described herein, the system 100 of FIG. 1 provides improved processes that are more streamlined and informative for the user than conventional processes. As used in the present specification and in the appended claims, the term "tool" is meant to be understood broadly as any device or implement that is designed to be coupled to a machine. In the examples described herein, the tool 102 includes a bucket, a clamshell, a blade, track assemblies, and a mechanical thumb, among other devices or implements. In the examples described herein, a bucket of a loading machine is presented as an example of the tool 102. Further, as used in the present specification and in the appended claims, the term "machine" is meant to be understood broadly as any mobile or stationary machine 104 to which the tool 102 is to be coupled and used to perform an operation involving physical movement of materials. The machine is associated with an industry, such as, without limitation, mining, construction, landscaping, forestry, transportation, agriculture, among others. Non-limiting examples of machines include loading machines, excavators, backhoes, dozers, drilling machines, trenchers, and drag lines, among other digging machines that use a tool 102 to dig, haul, and/or move materials. It is also to be understood that the machines depicted throughout the figures are shown primarily for illustrative purposes to assist in disclosing features of various aspects of the present disclosure, and that the figures do not depict all of the elements of the machines.

Figure 2:
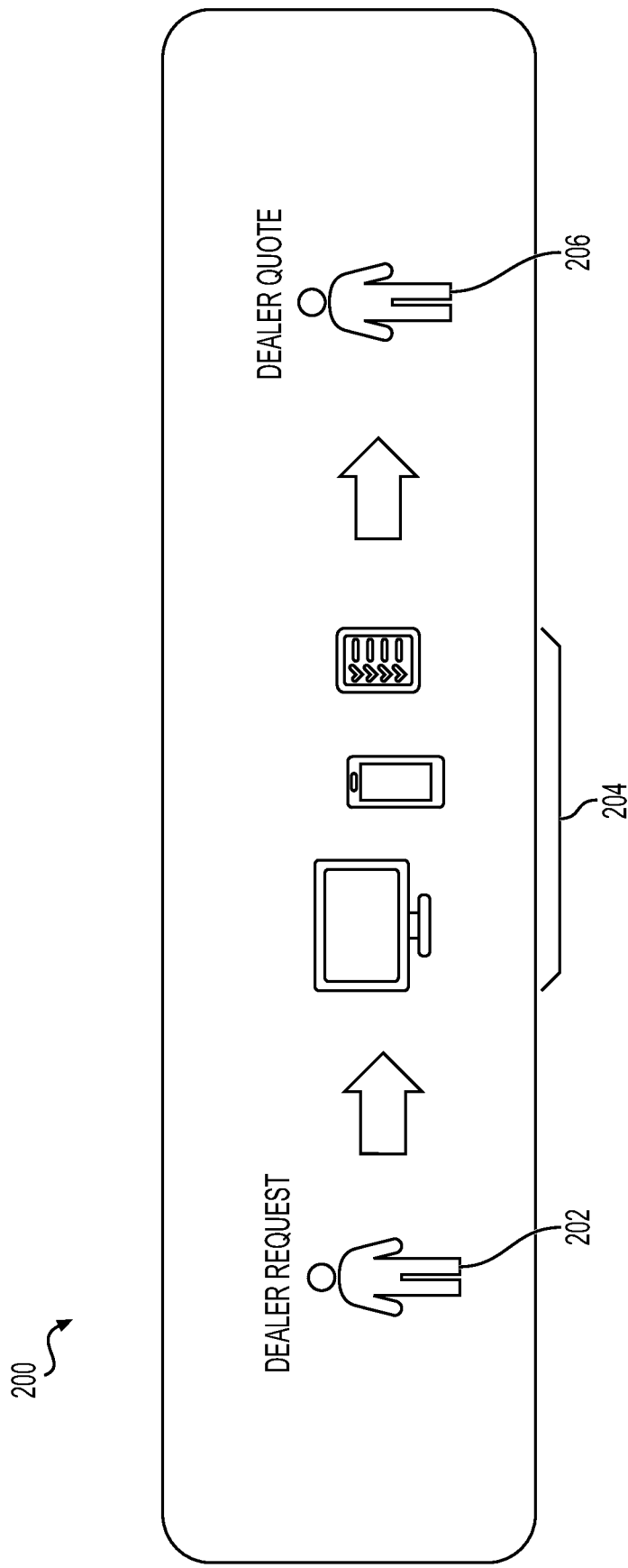
FIG. 2 is a schematic illustration of an exemplary process for a tool ordering process using a GUI described herein, according to aspects of this disclosure.

FIG. 2 is a schematic illustration of an exemplary process for a tool ordering using a GUI described herein, according to aspects of this disclosure. The process of FIG. 2 is a computer-implemented process that assists a user in ordering a tool 102 such as a bucket of a loading machine that further provides the user with specific information as to the fitness of the tool 102 with a designated loading machine and other devices and machines. As used in the present specification and in the appended claims, the term "fitness" is meant to be understood broadly as any state in which an element is suitably adapted to an environment. In the context of the present description, fitness of a tool 102 such as a bucket is a measure of how suitably adapted the tool 102 is if and when the tool 102 is coupled to a machine such as a loading machine. Further, in one example, in the context of the present description, fitness of a tool 102 such as a bucket is a measure of how suitably adapted the tool 102 is if and when the tool 102 is coupled to a machine such as the loading machine and how well it interfaces with other devices and machines such as linkages of the loading machine and a bed of a hauling machine into which the tool 102 is used to dump material into the bed. A number of parameters and metrics are used to define the fitness of the tool 102 and other devices and machines as described herein. Fitness for the tool 102, the loading machine, the hauling machine, their respective elements, and combinations thereof include a determination as to how close a given design solution of these devices are to achieving the set aims of compatibility. The set aims of compatibility include any parameter of the tool 102, the loading machine, the hauling machine, their respective elements, and combinations thereof that cause these devices, machines, and elements to function for their intended purposes in a compatible manner. The fitness also defines a suitability of the tool 102, the loading machine, the hauling machine, their respective elements, and combinations thereof given a desired level of compatibility.

A user 202 directly interfaces with a GUI displayed on a computing device(s) 204 as described herein to assist the user in a user-friendly manner to obtain a quote from a dealer 206 directly. The process of FIG. 2 overcomes the disadvantages described herein and in connection with conventional processes described below.

The tool matching and ordering systems and processes of FIGS. 1 and 2 and described throughout the description provided herein reduce or eliminate a complicated series of interactions with a number of individuals along a channel of commerce that assist a user in determining a tool to purchase and order that includes a number of user-defined or appropriate parameters. This process includes a user making a request to a dealer located at a sales desk who is familiar with a line of tools sold by a manufacturer of the tools. The dealer sends information to a work tools sale engineer and/or a global supply network division (e.g., a supply chain administrator) to assist in determining, among other items, parameters of the tool as defined by the user, a number of wear tools such as ground engaging tools (GETs) coupled to the tool, specifications of the tool, and supply chain issues with supplying the user with a completed tool. The work tools sale engineer, for example, provides advice or guidance to the user as to which tool or tool specifications work most effectively for the machine with which the user intends to use the tool. In this conventional process, the information provided by the work tools sale engineer may lack sufficient specificity and may be confusing to the user as to implications of adjustments to the specifications, since the user cannot visually comprehend the adjustments. Further, communications between the work tools sale engineer and the user may be misunderstood, unclear, or inadequate. This increases a risk of an ineffective or inappropriate tool being purchased or manufactured, at a cost in time and money to the manufacturer and the user.

The information collected by the work tools sale engineer and/or the global supply network division is sent to a work tools design engineer who designs the work tool based on information provided by the user, the work tools sale engineer, and/or the global supply network division. This perpetuates any previous miscommunications in the process. A large wheel loader (LWL) configuration engineer determines how the tool will affect the weight, maximum load capacities, swung loads, and other parameters of a machine system formed by the coupling of the tool and the machine, and an LWL performance and controls (P&C) engineer determines how the toll will affect the performance and control of the loading machine. An LWL marketing product application specialist and/or an LWL technical steward assists in creation of a quote and approving that quote. The quote defines a cost and/or delivery schedule of the tool to the user. Once approved, the quote is sent back to the dealer, which then delivers the quote to the user for consideration and/or purchase of the tool.

This conventional process may include a high volume of custom quote requests made by other users within the market to purchase tools. This may place an undue burden on the manufacturer and/or dealer of the tool when considering these high volumes of requests and how to manage client expectations. Further, inclusion of all of the individuals within the conventional process may create an additional overhead cost in manufacturing the tool. Still further, with the number of individuals involved in this conventional process, the time the manufacturer takes to receive and process the request from the user is compounded, taking several weeks to complete and order. Moreover, excessive documentation is produced from the conventional process. In addition, with the possibility of the high level of bucket customization provided via the conventional process, this results in a very large number of new tool part numbers being created on an annual basis.

Even still further, the conventional process may result in incorrect tool wear parts being applied to the tool for the application for which the user intends to use the tool. Coupling incorrect wear parts to a tool for the user-intended use of the tool may result in premature tool maintenance issues. Further, the conventional process may result in a tool size being incorrectly selected. For example, under-sizing the tool may result in an ineffective use of the tool and machine due to loss of productivity (e.g., in tons per hour of material loaded) at a worksite. In this example, an under-sized tool results in additional round trips for the machine between, for example, a material pile and a hauling machine or hopper receiving the load from the machine. In another example, an oversized tool results in exceeding a maximum swung load and a machine tipping load that, in turn, may increase wear on the tool and/or machines.

The conventional process may require consultation of various experts across several functional areas including marketing, engineering, sales, and manufacturing, and may take several weeks to complete, resulting in customer complaints. Further, this conventional process may lack visual representation of a configured tool, which may result in confusion with customer requirements and occasionally an incorrect tool being shipped by the manufacturer and returned to the manufacturer by the user. Still further, the conventional process may provide a limited selection of tools, and may be limited to rough sizing guidelines. In contrast, the processes provided via the system 100 of FIGS. 1 and 2 and the remainder of the description provided herein, reduces or eliminates deficiencies of the conventional processes.

As used in the present specification and in the appended claims, the terms "graphical user interface" or "GUI" are meant to be understood broadly as any user interface or collection of user interfaces that allow users to interact with computing devices 204 through the senses of the user. The GUIs include interactive elements such as selection interface elements, audio indicators, visual metaphors, and pointing devices, among other elements to provide user interaction with the computing device through direct manipulation of the interactive elements. The GUIs 300, 400, 500, 600, 700, 800 described herein with respect to FIGS. 3 through 8 are presented as a result of the execution of computer-readable and/or computer-executable instructions and are collectively referred to as a single GUI or are referred to as separate GUIs. The GUIs are displayed on a display device of the computing device(s) 204.

Figure 3:
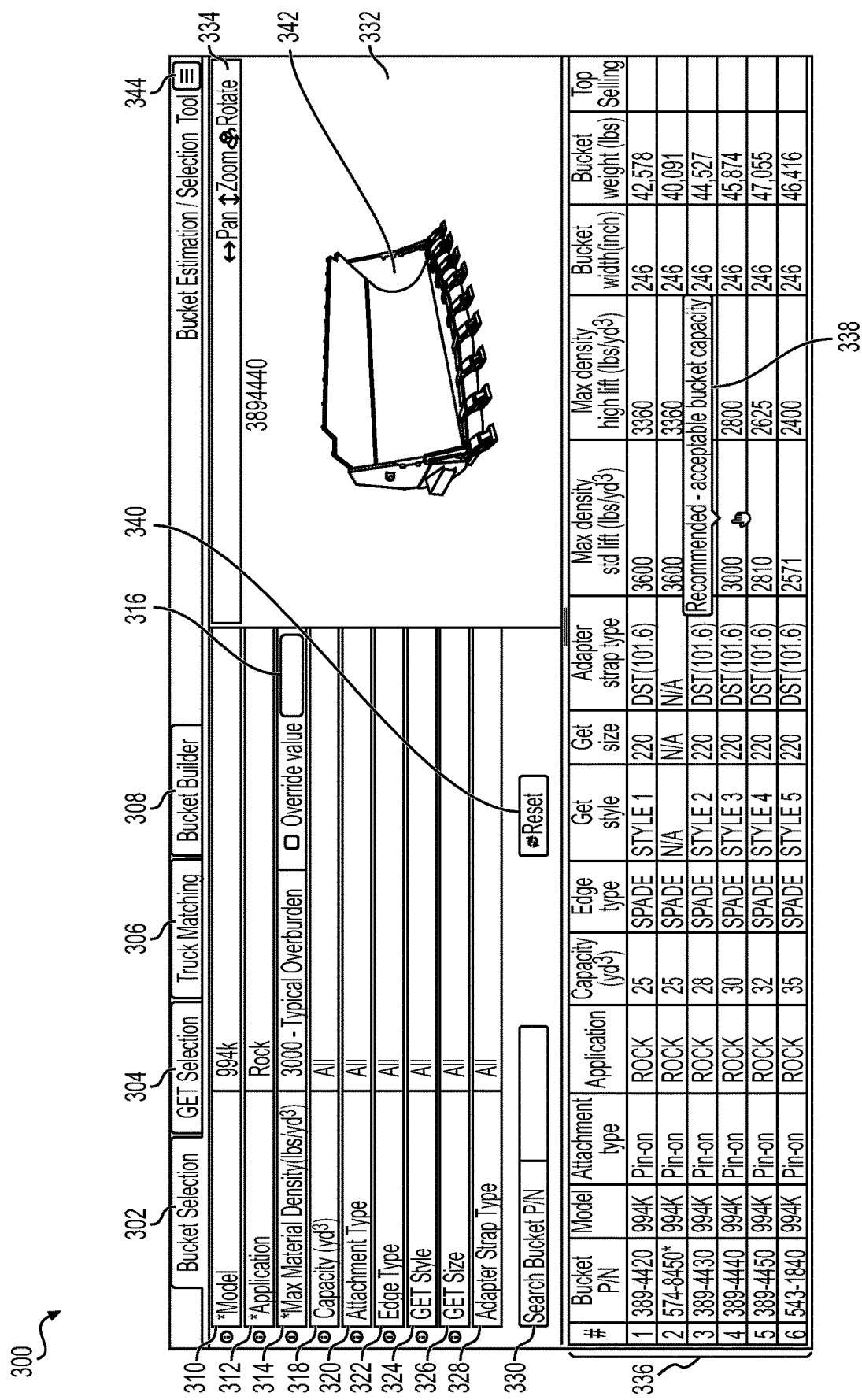
FIG. 3 is a schematic illustration of a GUI for selecting a tool for a machine, according to an example of the principles described herein.

FIG. 3 is a schematic illustration of a GUI 300 for selecting a tool for a machine, according to an example of the principles described herein. For example, the GUI 300 is an example GUI that can be displayed on a display of a user device, such as a desktop computer, laptop computer, personal digital assistant (PDA), handheld device, mobile device, smartphone, gaming system, and/or tablet device, among other electronic devices. The GUI 300 is displayed to a user in response to a user selecting, e.g., via some interaction with the device displaying the GUI 300, a bucket selection tab 302. In addition to the bucket selection tab 302, FIG. 3 also shows a ground engaging tool (GET) selection tab 304, a truck matching tab 306, and a bucket builder tab 308 in an unselected state. As will be appreciated, selection of the GET selection tab 304, the truck matching tab 306, and the bucket builder tab 308 will cause display of different GUIs, which are described in more detail herein. Although illustrated and described as being accessed via "tabs," the GUIs described can be otherwise accessed, including via any interface element selectable or otherwise interactive elements, e.g., drop-down menus, lists, or the like, which allow a user to select different or altered GUIs for display.

The bucket selection tab 302 includes a model selection interface element 310. The model selection interface element 310, when selected, allows for the input of a model of a machine. In one example, the model selection interface element 310 includes a drop-down menu that allows a user to select from a number of models of machines listed therein. In the example of FIG. 3, the model of the machine selected is a "994k" model, which corresponds to a wheel loader manufactured and sold by Caterpillar, Inc. Further, in one example, a search engine is provided in association with the model selection interface element 310 to allow a user to search for a model of a machine. Further, in one example, the drop-down menu of the model selection interface element 310 includes images of the respective models of machines for the user to utilize as a way to confirm the model of machine they have selected. In one example, the user may desire to replace or purchase a tool 342 for a machine they currently own and having an image of the machines assists the user in pictorially identifying which model of machine they own. In one example, the GUI 300 may not allow a user to enter data in other fields of the GUI 300 until the user selects a model of a machine via the model selection interface element 310. This ensures that the machine is first selected to serve as a basis for providing a user with a list of candidate tools that are applicable to the machine for which the user is seeking to purchase a tool 342.

The bucket selection tab 302 also includes an application selection interface element 312. The application selection interface element 312, when selected, allows for the input of an application of the tool 342. In one example, the application selection interface element 312 includes a drop-down menu that allows a user to select from a number of applications of the tool 342 listed therein. An application includes any scenario or material for which the user intends to use the tool 342 to dig and move. In the example of FIG. 3, the application selected by the user is "Rock." Further, in one example, a search engine is provided in association with the application selection interface element 312 to allow a user to search for an application.

Further, in one example, the drop-down menu of the application selection interface element 312 includes a graphical representation such as a chart that depicts a material gradient. The material gradient defines an abrasion level defining a level of abrasion on the tool and/or GETs for a particular material along a y-axis of the chart and an impact level defining a level of impact on elements of the tool 342 such as side-cutter devices and sidebar protectors coupled to the tool 342 along an x-axis of the chart. The chart depicts the materials in a gradient where less abrasive and impactful materials are depicted toward an origin at the bottom left end of the chart and increasingly more abrasive and impactful materials are depicted in gradient away from the origin. Some examples of materials presented to the user for selection include, from least abrasive and least impactful to relatively more abrasive and more impactful include: top soil, talc, loam, gypsum, clay, coal, well shot limestone, shale, silt, sand, gravel, poorly shot limestone, travertine, ripped basalt, caliche, basalt, short granite, dolomite, frost, gabbro, gneiss, high silica sand, peridotite, ore, granite, broken slag, quartzite, and corundum, among a myriad of other materials. These materials are used to pictorially assist the user in selecting applications from the list of applications within the drop-down menu of the application selection interface element 312 including, for example, coal, extreme duty rock, general purpose, heavy duty general purpose, heavy duty granite, heavy duty rock, high abrasion, iron ore, marble, rock, slag, standard rock, woodchip, among other applications. In one example, the terminologies used in connection with the materials and applications presented within the drop-down menu of the application selection interface element 312 varies as different models are selected by the user via the model selection interface element 310.

In one example, the GUI 300 may not allow a user to enter data in other fields of the GUI 300 until the user selects an application of the tool 342 via the application selection interface element 312. This ensures that the application of the tool 342 is selected early in the process to serve as a basis for providing a user with a list of candidate tools that are applicable to the application of use of the tool 342 for which the user is seeking to purchase the tool.

The bucket selection tab 302 also includes a maximum material density selection interface element 314. The maximum material density selection interface element 314, when selected, allows for the input of a maximum material density of a material the user intends to dig and move with the tool 342 in, for example, pounds per cubic yards (lbs./yd$^3$). In one example, the maximum material density selection interface element 314 includes a drop-down menu that allows a user to select from a number of maximum material densities listed therein. The drop-down menu of the maximum material density selection interface element 314 includes a list of densities, and, in one example, includes materials associated with corresponding densities. Densities include for example, between 800 lbs./yd$^3$ through approximately 3,700 lbs./yd$^3$. In the example of FIG. 3, the density is set at 3,000 lbs./yd$^3$ for "typical overburden." In one example, an override value selection 316 is selected by the user where the user enters any value of the density. In this example, the override value selection 316 includes a checkbox the user selects to make the override value selection 316 active and enter the desired density value. For example, the override value defines a user-specified material density or maximum material density of a material the user intends to use the tool to move.

In one example, the GUI 300 may not allow a user to enter data in other fields of the GUI 300 until the user selects a material density via the maximum material density selection interface element 314. This ensures that the material density is selected early in the process to serve as a basis for providing a user with a list of candidate tools that are applicable to the material density for which the user is seeking to purchase the tool.

The bucket selection tab 302 also includes a capacity selection interface element 318. The capacity selection interface element 318, when selected, allows for the input a capacity of tool 342 in, for example, cubic yards (yd$^3$). In one example, the capacity selection interface element 318 includes a drop-down menu that allows a user to select from a number of capacities of the tool 342 listed therein. In one example, the capacity includes "all" capacities as indicated in FIG. 3. By designating "all" capacities, the user may not restrict a number of candidate tools that are presented to the user via the GUI 300. In contrast, by selecting a specific capacity via the capacity selection interface element 318, the number of tools displayed to the user are restricted to tools that have that specific capacity.

The bucket selection tab 302 also includes an attachment type selection interface element 320. The attachment type selection interface element 320, when selected, allows for the input of a type of attachment the tool 342 uses to mechanically interface with and couple to the machine. In one example, the attachment type selection interface element 320 includes a drop-down menu that allows a user to select from a number of attachment types listed therein. In one example, the attachment type includes "all" attachment types as indicated in FIG. 3. By designating "all" attachment types, the user may not restrict a number of candidate tools presented to the user via the GUI 300. In contrast, by selecting a specific attachment type via the attachment type selection interface element 320, the number of tools displayed to the user is restricted to tools that have that specific attachment type.

The bucket selection tab 302 also includes an edge type selection interface element 322. The edge type selection interface element 322, when selected, allows for the input a type of leading edge the tool 342 has including, for example, a flat edge, a serrated edge, a blank edge, and a spade edge, among other types of edges. In one example, the edge type selection interface element 322 includes a drop-down menu that allows a user to select from a number of edge types listed therein. In one example, the edge type includes "all" edge types as indicated in FIG. 3. By designating "all" edge types, the user may not restrict a number of candidate tools that are presented to the user via the GUI 300. In contrast, by selecting a specific edge type via the edge type selection interface element 322, the number of tools displayed to the user are restricted to tools that have that specific edge type.

The bucket selection tab 302 also includes a GET style selection interface element 324. The GET style selection interface element 324, when selected, allows for the input of a type of ground engaging tool that are coupled to the tool 342 including, for example, teeth segments, various series of GETs, half arrow segments, mechanically attached shrouds, weld-on segments, weld-on cutting edges, bolt-on cutting edges, and bolt-on serrated edge segments, among other types of GETs. The GETs are additional elements mechanically coupled to the tool 342 that serve to extend the life of the tool 342 by protecting leading edges of the tool 342 from stress and wear. In one example, the GET style selection interface element 324 includes a drop-down menu that allows a user to select from a number of GET styles listed therein. In one example, the GET style includes "all" GET styles as indicated in FIG. 3. By designating "all" GET styles, a number of candidate tools that are presented to the user via the GUI 300 is not restricted. In contrast, by selecting a specific GET style via the GET style selection interface element 324, the number of tools displayed to the user are restricted to tools that have that specific GET style included thereon.

The bucket selection tab 302 also includes a GET size selection interface element 326. The GET size selection interface element 326, when selected, allows for the input of a size of the GETs that are coupled to the tool. In one example, the GET size selection interface element 326 includes a drop-down menu that allows a user to select from a number of GET sizes listed therein. In one example, the GET size includes "all" GET sizes as indicated in FIG. 3. By designating "all" GET sizes, the user not restricts a number of candidate tools that are presented to the user via the GUI 300. In contrast, by selecting a specific GET size via the GET size selection interface element 326, the number of tools displayed to the user are restricted to tools that have that specific GET size.

The bucket selection tab 302 also includes an adapter strap type selection interface element 328. The adapter strap type selection interface element 328, when selected, allows for the input of an adapter type associated with coupling GETs to the tool. In one example, the adapter strap type selection interface element 328 includes a drop-down menu that allows a user to select from a number of adapter strap types listed therein including, for example, a double strap (DST), a flush mount (FMT), offset surfaces, and flush surfaces, among other types of adapter straps. In one example, the adapter strap type includes "all" adapter strap types as indicated in FIG. 3. By designating "all" adapter strap types, the user may not restrict a number of candidate tools that are presented to the user via the GUI 300. In contrast, by selecting a specific adapter strap type via the adapter strap type selection interface element 328, the number of tools displayed to the user are restricted to tools that have that specific adapter strap type.

The bucket selection tab 302 also includes a bucket part number (P/N) search field 330. In examples, a user can enter a bucket P/N into the bucket P/N search field 330, and, in response, the GUI 300 will display a specific part associated with the input bucket P/N. Further, the bucket selection tab 302 includes a reset selection interface element 340, that, when selected by a user, resets inputs associated with at least one of the selection interface elements 310, 312, 314, 318, 320, 322, 324, 326, 328 and/or the override value selection 316, resets the values included in these fields. In one example, selection of the reset selection interface element 340 results in the selection interface elements 310, 312, 314, 318, 320, 322, 324, 326, 328 and/or the override value selection 316 resetting the values to "all" such that the number of candidate tools that are presented to the user via the GUI 300 is not restricted. Further, in one example, each of the selection interface elements 310, 312, 314, 318, 320, 322, 324, 326, 328 and/or the override value selection 316 includes pictorial depictions of the respective elements to assist the user in identifying the tool, the GETs, and other elements in selecting the desired tool 342 and parts.

The GUI 300 also includes a candidate tool list 336. The candidate tool list 336 includes a number of tools that qualify as candidate tools based on the user inputs provided via the selection interface elements 310, 312, 314, 318, 320, 322, 324, 326, 328 and/or the override value selection 316. Stated another way, the candidate tool list 336 presents a number of tools 342 that are fit for or reach a threshold level of fitness for coupling to a machine and for use based on the interface elements described herein. As additional selections are made via the selection interface elements 310, 312, 314, 318, 320, 322, 324, 326, 328 and/or the override value selection 316, the list includes relatively fewer but more appropriate tools based on the criteria defined by the entries to the selection interface elements 310, 312, 314, 318, 320, 322, 324, 326, 328 and/or the override value selection 316. Six separate tools are depicted in the tool candidate list 336 that may be coupled to and appropriately used with the model of machine selected at the model selection interface element 310.

The candidate tool list 336 also includes parameters of the tools displayed therein. For example, the GUI 300 illustrates a tool (e.g., bucket) P/N, the model of the machine, e.g., the model input at the model selection interface element 310, the attachment type of the tool P/N, the application for use of the tool, a capacity of the tool, an edge type of the tool, the GET style of any GETs coupled to the tool, a GET size of any GETs coupled to the tool, an adapter strap type used to couple the GETs to the tool, a maximum material density of a material the user intends to dig and move with the tool 342 with a standard lift linkage, a maximum material density of a material the user intends to dig and move with the tool 342 with a high lift linkage, a tool (e.g., bucket) width, a tool (e.g., bucket) weight, and an indicator as to whether the tool 342 is a top selling item. In other examples, the candidate tool list 336 includes more, fewer, and/or different parameters associated with the tools that meet the criteria. In examples, the tool candidate list 336 includes additional visual cues for a user. For example, the tool candidate list 336 can include color-coding or offsetting the candidate tools to indicate whether a specific tool is recommended, not recommended, is reaching an upper limit of capacity, is reaching a lower limit of capacity, qualifies as a candidate tool, does not qualify as a candidate tool, or the like. Further, in one example, a notification 338 is displayed in response to selection of a cell. The notification 338 provides additional information as to why a tool 342 is a recommended tool. In the example of FIG. 3, the notification 338 indicates that the tool 342 designated by P/N 389-4440 is a recommended tool 342 because of its acceptable bucket capacity. In some examples, the notification 338 appears as a cursor is hovered over an entry within the tool candidate list 336. The notification 338 includes information regarding whether a particular tool 342 is recommended, if the tool 342 has a capacity that is close to a lower limit or an upper limit, whether the tool capacity is too small or too large, and whether a user should consult a payload policy to obtain more information regarding payload, among other notifications regarding the fitness of the tool.

The GUI 300 also includes a tool preview window 332 that provides a preview of the tool 342 as selected in the tool candidate list 336. For example, the P/N 389-4440 listed in the tool candidate list 336 has been selected by the user in FIG. 3, and a pictorial representation of that tool 342 is rendered in the tool preview window 332. In one example, the tool preview window 332 includes a three-dimensional (3D) rendering of the tool 342 where a 3D model of the tool 342 is rendered as a two-dimensional (2D) image or animation on a display device. In this example, a number of visual tools 334 are included along with the tool preview window 332 including, for example, a pan selection, a zoom selection, and a rotate selection to allow the user to manipulate the rendering of the tool 342 and view the tool 342 from different sides and angles. In these examples, if the user selects another tool 342 from the tool candidate list 336, that tool 342 is displayed in the tool preview window 332.

The GUI 300 also includes a number of menu selections including a menu selection 344. As described in more detail herein, the menu selection 344 provides additional functionality allowing a user to save projects, create new projects, open saved projects, adjust program settings, login and logout of the program, create quotes, and compare products, among other processing functionalities.

Figure 4:
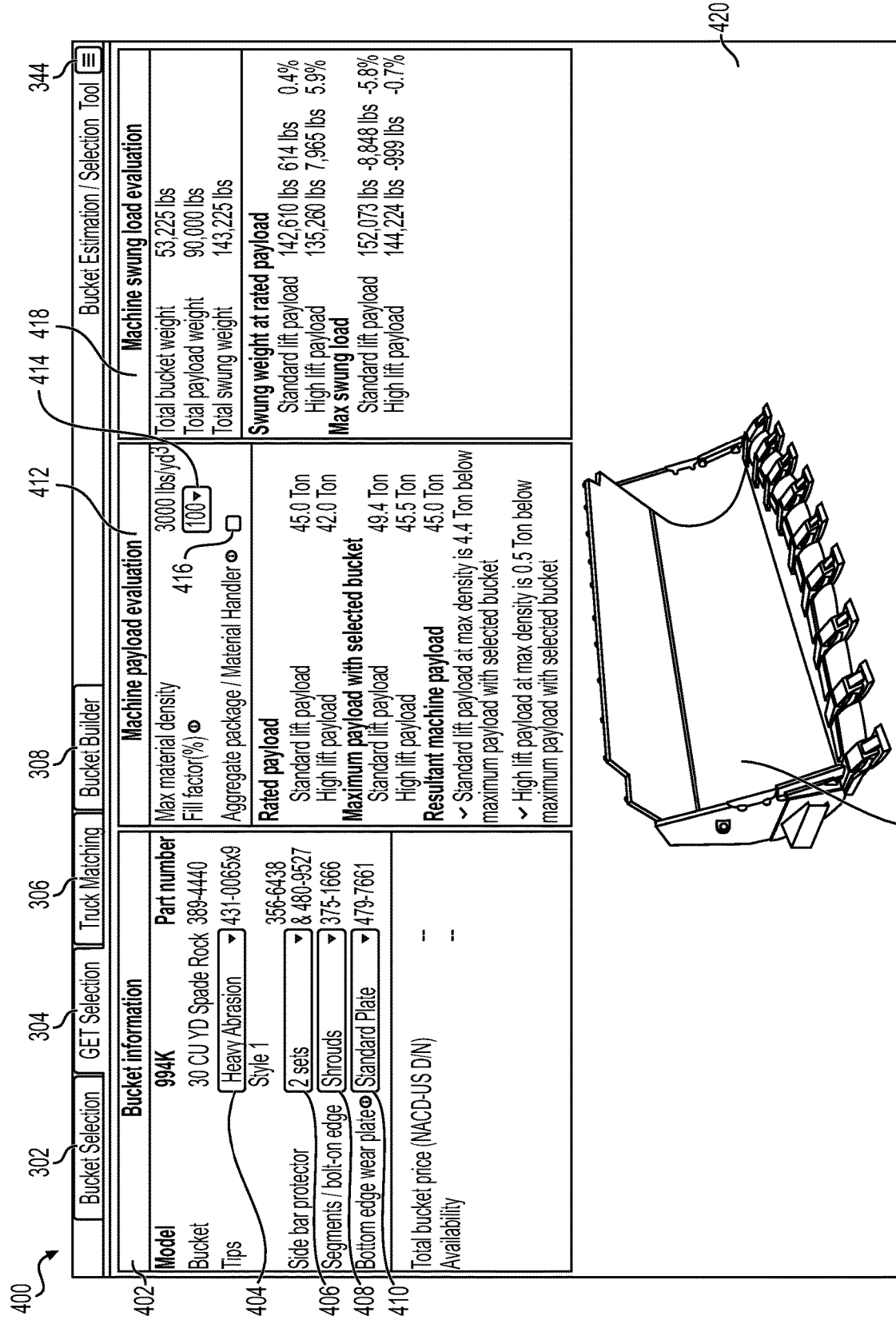
FIG. 4 is a schematic illustration of a GUI for selecting a ground engaging tool (GET), according to an example of the principles described herein.

FIG. 4 is a schematic illustration of a GUI 400 for selecting a ground engaging tool (GET), according to an example of the principles described herein. The GUI 400 is accessible by selection of the GET selection tab 304. The GUI 400 provides a user with the ability to specify GET parameters. Further, the GET selection tab 304 provides information regarding selected GETs in order to inform the user of how addition of a number of GETs affect the functionality of a tool, such as the tool 342 selected via the GUI 300, as well as a machine to which the tool 342 is coupled.

The GET selection tab 304 includes a tool (e.g., bucket) information window 402 that includes information about a tool, e.g., the tool 342 selected via the GUI 300, and associated machine including, for example, the model of the machine, the P/N of the tool, and information about the tool. In FIG. 4, the P/N is 389-4440, e.g., as selected at the tool candidate list 336 of the GUI 300 of FIG. 3. The information supplied to the user regarding the tool 342 includes, for example, a capacity of the tool, an edge type of the tool, and an intended application of the tool, among other types of information. In the example of FIG. 4, the information includes "30 CU YD Spade Rock" denoting a 30 cubic yard (yd$^3$) capacity tool 342 with a spade edge and an intended application of digging and moving rock. This information is determined from information input via the GUI 300.

The GET selection tab 304 also includes a tip selection interface element 404. The tip selection interface element 404 includes a drop-down menu that allows a user to select from a number of types or classifications of "tip" GETs. Tips are used to dig into a material and provide an initial wear interface with the material, e.g., to avoid degradation or destruction of the tool 342. The tips are coupled to the front of the tool 342 to assist in digging into the material. The tips are classified based on their intended use. Examples of types or classifications of GETs included in the tip selection interface element 404 include coal, heavy abrasion, heavy abrasion aggregated raw material (ARM), heavy duty, and heavy penetration, among other types of GETs. In the example of FIG. 4, a "heavy abrasion" tip is selected. In one example, because the model of the machine and the tool 342 have been selected via the GUI 300 of FIG. 3, the number of available tips provided as selections in the tip selection interface element 404 are filtered to include only those tips that are compatible with the selected model of machine and tool. Further, in one example, once the type or classification of GET is selected via the tip selection interface element 404, a P/N and/or name of the tip is displayed proximate the tip selection interface element 404. In the example of FIG. 4, the part number is indicated as "431-0065x9" and the name of the part is indicated as "Style 1." In instances where the user is familiar with a specific tip product, the P/N and/or name serves as confirmation to the user that the correct tip has been selected.

The GET selection tab 304 also includes a side bar protector selection interface element 406. The side bar protector selection interface element 406 includes a drop-down menu. The drop-down menu allows a user to select from a number of side bar protectors that are used to reinforce side portions of the tool 342 during digging operations. Like the tips, the side bar protectors provide an initial wear interface with the material to avoid degradation or destruction of the tool 342. In one example, a number of sets of side bar protectors are selected via the side bar protector selection interface element 406, and, in the example of FIG. 4, two sets are selected. In one example, because the model of the machine and the tool 342 have been selected in the bucket selection tab 302 of the GUI 300 of FIG. 3, the number of available side bar protectors provided as selections in the side bar protector selection interface element 406 is filtered to include those side bar protectors that are compatible with the selected models of machine and tool. Further, in one example, once the side bar protector is selected via the side bar protector selection interface element 406, a P/N and/or name of the side bar protector are displayed proximate the side bar protector selection interface element 406. In the example of FIG. 4, the part numbers are indicated as "356-6438" and "480-9527" since two different sets of side bar protectors are selected in the example of FIG. 4. In instances where the user is familiar with a specific side bar protector product, the P/N and/or name serves as confirmation to the user that the correct side bar protector has been selected.

The GET selection tab 304 also includes a segments/bolt-on edge selection interface element 408. The segments/bolt-on edge selection interface element 408 includes a drop-down menu. The drop-down menu allows a user to select from a number of segments and/or bolt-on edges. Such features are used to reinforce the portions of the tool 342 between the tips during digging operations and provide an initial wear interface with the material in order to avoid degradation or destruction of the tool 342. In the example of FIG. 4, a "shroud" style of bolt-on edge is selected. Examples of segments and/or bolt-on edges available for selection via the segments/bolt-on edge selection interface element 408 includes half arrows, shrouds, mechanically attached shrouds, weld-on segments, weld-on cutting edges, bolt-on cutting edges, and bolt-on serrated edge segments, among other types of segments and/or bolt-on edges. In one example, because the model of the machine and the tool 342 have been selected in the GUI 300 of FIG. 3, the number of available segments and/or bolt-on edges provided as selections in the segments/bolt-on edge selection interface element 408 are filtered to include those segments and/or bolt-on edges that are compatible with the selected model of machine and tool. Further, in one example, once the segments and/or bolt-on edges are selected via the segments/bolt-on edge selection interface element 408, a P/N and/or name of the side bar protector is displayed proximate the segments/bolt-on edge selection interface element 408. In the example of FIG. 4, the part number is indicated as "375-1666." In instances where the user is familiar with a specific segments/bolt-on edge product, the P/N and/or name serve as confirmation to the user that the correct segments/bolt-on edge has been selected.

The GUI 400 also includes a bottom edge wear plate selection interface element 410. The bottom edge wear plate selection interface element 410 includes a drop-down menu that allows a user to select from a number of wear plates. Wear plates are used to reinforce the bottom portions of the tool 342 during digging and scraping operations and provide an initial wear interface with the material in order to avoid degradation or destruction to the tool 342 itself. In the example of FIG. 4, a "standard plate" style of wear plate is selected. In one example, because the model of the machine and the tool 342 have been selected in the GUI 300 of FIG. 3, the number of available wear plates provided as selections in the bottom edge wear plate selection interface element 410 are filtered to include those wear plates that are compatible with the selected model of machine and tool. Further, in one example, once the wear plates are selected via the bottom edge wear plate selection interface element 410, a P/N and/or name of the wear plates are displayed proximate the bottom edge wear plate selection interface element 410. In the example of FIG. 4, the part number is indicated as "479-7661". In instances where the user is familiar with a specific wear plate product, the P/N and/or name serve as confirmation to the user that the correct wear plate has been selected.

In one example, a processing system generates an updated rendering of the tool 342 based on selections made via the side bar protector selection interface element 406, the side bar protector selection interface element 406, the segments/bolt-on edge selection interface element 408, and/or the bottom edge wear plate selection interface element 410. The updated rendering is displayed via a tool preview window 420. This allows a more interactive and informative interface for the user to confirm that the selected GETs are the expected GETs. In examples, the updated rendering is a two-dimensional rendering of a three-dimensional model of the tool with GETs. The updating rendering is manipulatable, e.g., to view the tool with GETs from various angles, to zoom in/out and/or otherwise.

The tool information window 402 also includes information regarding a total bucket price and an availability or in-stock status of the tool. In the example of FIG. 4, the price and availability are not indicated due to the custom nature of the order of the tool.

The GET selection tab 304 also includes a machine payload evaluation window 412. The machine payload evaluation window 412 provides information regarding engineering calculations and parameters indicative of the selections made via the selection interface elements 404, 406, 408, 410. The machine payload evaluation window 412 includes information regarding the maximum material density selected via the maximum material density selection interface element 314 of the GUI 300 of FIG. 3. A fill factor selection interface element 414 is included in the machine payload evaluation window 412 to allow a user to select a percentage of the volume of the tool 342 that the bucket will be expected to fill during a dig operation. In the example of FIG. 4, the fill factor is 100%.

The machine payload evaluation window 412 also includes an aggregate package/material handler selection button 416 that allows a user to indicate that they intend on using the machine and tool 342 to re-handle free flowing aggregates such as piles of soil or gravel. Because these aggregate piles of material have relatively less impact on the tool 342 and relatively less strain on the machine, a larger volume of this aggregate material may be scooped by the tool 342 with a relatively less degree of danger in damaging parts of the tool 342 and/or machine. In one example, an attachment such as a counterweight is included as a package with the completed tool. The aggregate package allows the user to move larger volumes of material in fewer passes in, for example, yard applications such as on-highway truck loading, rail car loading, stock pile management, and load and carry applications. With up to an approximately 20% payload increase, the aggregate package allows the user to load on-highway trucks and rail cars with an improved pass match. In contrast, the aggregate package/material handler selection button 416 may not be selected in, for example, quarry face or blasted material applications. Thus, in one example where the user indicates at the application selection interface element 312 of FIG. 3 an application other than aggregate re-handling, the aggregate package/material handler selection button 416 may not be available for selection by the user. Further, in one example, the aggregate package/material handler selection button 416 is selectively available or unavailable based on other factors. For instance, when the tool 342 is other than a general-purpose tool 342 and/or the model of machine interface element is other than a machine that includes, for example, a lift linkage configuration. Other parameters associated with the tool 342 and/or the machine will enable or disable selection of the aggregate package/material handler selection button 416.

The machine payload evaluation window 412 also includes a number of parameters that are a result of the selection of the tool, the GETs, and/or the machine. These parameters include, for example, a rated payload of the tool 342 with a standard lift linkage and a high lift linkage, a maximum payload with the selected tool (e.g., bucket) with a standard lift linkage and a high lift linkage, and a resultant machine payload, among other parameters. Lift linkages are those elements that the tool 342 is coupled to and are intermediary to the tool 342 and a body of the machine. A high lift linkage is a lift linkage that allows for the tool to be raised relatively higher from the ground as compared to the standard lift linkage. As to the resultant machine payload, the user may be designated "bonus" payload or "de-rated" payload based on the selections made regarding the GETs in the GUI 300 and/or the GUI 400. As a result, selection of lighter GETs, for example, allows the user to be designated the bonus payload since the lighter GETs allow for more weight to be carried by the tool 342 and/or machine.

The calculation used by the computing device(s) 108, the data processing systems 120, and/or the dealer computing device(s) 122 to determine the maximum payload (without the tool selected by the user attached) includes, for example:

$$\text{Max}_{payload} = \text{Max}_{swung\ weight} - \text{Tool}_w \qquad \text{Eq. 1}$$

where $\text{Max}_{payload}$ is the maximum payload of the machine, $\text{Max}_{swung\ weight}$ is the maximum swung weight of the machine, and $\text{Tool}_w$ is the weight of the tool selected by the user using the GUIs described herein. In one example, the maximum swung load of the machine may be a function of the weight of the machine and the weight of the linkage of the machine, but is not a summation of the two weights. The values of Equation 1 are compared to the payload values included in the tool data 124 of the tool matching system 120 to determine if the payload values are below or exceed maximum payloads for the machine. Thus, the $\text{Max}_{payload}$ increases as the $\text{Tool}_w$ decreases. Further, the calculation used by the computing device(s) 108, the data processing systems 120, and/or the dealer computing device(s) 122 to determine the maximum payload with the selected tool may include, for example:

$$\text{Max}_{swung\ weight} = \text{Mach}_w + \text{Link}_w + \text{Tool}_w \qquad \text{Eq. 2}$$

where $\text{Max}_{swung\ weight}$ is the maximum swung weight of the machine, $\text{Mach}_w$ is the weight of the machine at the rated payload, $\text{Link}_w$ is the weight of the linkage, and $\text{Tool}_w$ is the weight of the tool selected by the user. The values of Equations 1 and 2 are compared to the tool data 124 of the tool matching system 120 to determine if the values are below or exceed maximum payloads and maximum swung weight for the machine. Thus, the $\text{Max}_{payload}$ increases as the $\text{Tool}_w$ decreases.

Along with the resultant machine payload, the machine payload evaluation window 412 also includes a number of factual statements that lead the user to recommendations as to how the user may make better selections of the tool 342 and/or GETs to design a more efficient tool. The factual statements include values indicating whether the payload values are below or exceed maximum payloads for the machine. In the example of FIG. 4, the machine payload evaluation window 412 includes a first factual statement that states, "Standard lift payload at max density is 4.4 Ton below maximum payload with selected bucket." Here, the GUI 400 indicates to the user that a larger tool 342 and/or more robust GETs are selected to accommodate larger volumes of material as a recommendation. A second factual statement states, for example, "High lift payload at max density is 0.5 Ton below maximum payload with selected bucket." Here, again, the GUI 400 indicates to the user that a larger tool 342 and/or more robust GETs are selected to accommodate larger volumes of material as a recommendation.

In one example where the selected tool 342 is relatively larger and/or more robust GETs are selected, a warning is provided instead of the recommendations to inform the user that the standard and/or high lift payloads are exceeded using warnings such as "Standard lift payload at max density is 2.3 Ton above maximum payload with selected bucket," and "High lift payload at max density is 6.3 Ton above maximum payload with selected bucket." Further, in one example, the recommendations and warnings are displayed in different colors with the recommendations being displayed in, for example, blue or green, and the warnings being displayed in yellow or red. Still further, the recommendations and warnings are associated with visual indicators such as, for example, checkmarks for the recommendations and caution or stop signs for the warnings. In this manner, the machine payload evaluation window 412 provides the user with information regarding the fitness of the tool, the GETs, and the machine by displaying information regarding the payload of the machine system made up of the tool, the GETs, and the machine. As the user adjusts parameters associated with the tool, the GETs, and the machine, the recommendations and warnings of the machine payload evaluation window 412 is updated to provide real-time feedback to the user.

The GET selection tab 304 also includes a machine swung load evaluation window 418. The machine swung load evaluation window 418 provides information to the user regarding a swung load of the machine system including the tool, the GETs, and the machine. A swung load is defined as a total weight swinging at a tool end of the machine and is calculated as a weight of the tool 342 plus a weight of a payload in the tool. For example, a swung weight at a rated payload for a wheeled loader, includes a weight of a bucket including any GETs coupled thereto at a determined payload of the machine. The calculation used by the computing device(s) 108, the data processing systems 120, and/or the dealer computing device(s) 122 to determine the total tool weight includes, for example:

$$\text{Total tool}_w = \text{Tool}_w + \text{GET}_w \qquad \text{Eq. 3}$$

where Total tool$_w$ is the total tool weight at a rated payload of the machine, Tool$_w$ is the weight of the tool, and GET$_w$ is the weight of the GETs. Further, the swung weight satisfies a center of mass equation at all positions of the tool 342 with respect to the remainder of the machine (e.g., even when fully extended away from the machine). In the case of a system of particles $P_i$, i=1, 2, ..., n, each with mass $m_i$ that are located in space with coordinates $r_i$, i=1, 2, ..., n, the coordinates R of the center of mass satisfy the condition $$\sum_{i=1}^{n} m_i(r_i - R) = 0 \qquad \text{Eq. 4}$$

Solving this equation for R yields the formula $$R = \frac{1}{M}\sum_{i=1}^{n} m_i r_i \qquad \text{Eq. 5}$$

where M is the sum of the masses of all of the particles.

Again, the maximum swung load may be defined as a total weight swinging at a tool end of the machine and may be calculated as a weight of the tool 342, plus a weight of any GETs coupled thereto, and plus a weight of material scooped by the bucket at 100% fill capacity. Further, the maximum swung load satisfies the center of mass equations presented above at all positions of the tool 342 with respect to the remainder of the machine (e.g., even when fully extended away from the machine) as included in Equations 4 and/or 5 above.

Thus, the machine, the tool 342, the GETs, and the material scooped by the tool 342 are considered when determining the machine swung load metrics provided within the machine swung load evaluation window 418. The machine swung load evaluation window 418 includes a number of parameters including a total tool (e.g., bucket) weight, a total payload weight, and a total swung weight. The total tool weight includes a weight of the selected tool. The total payload weight includes the total tool weight plus a weight of all GETs selected to be coupled to the tool 342 (e.g., tips, segments, sidebars, etc. selected to be coupled to the tool). The total swung weight is the total payload weight plus the weight of a payload in the tool 342 at a percentage of fill capacity defined by the fill factor selection interface element 414. In the example of FIG. 4, the total tool weight is 53,225 pounds (lbs.), the total payload weight is 90,000 lbs., and the total swung weight is 143,225 lbs. for the specific model of machine and selected tool 342 and GETs indicated in the GET selection tab 304. The total tool weight, total payload weight, and a total swung weight is obtained by accessing data regarding the tool 342 such as the tool data 124 included within the tool matching system 120 of the system 100 of FIG. 1. The tool data 124 includes data about the tool 342, the machines, the linkages of the machines, and/or the combinations thereof. Thus, the weights, payloads, swung payloads, and other metrics described herein are calculated using the data obtained from the tool data 124. For example, the model 994k of the machine selected at model selection interface element 310 and other selections made at the interface elements 312, 314, 316, 318, 320, 322, 324, 326, 328, and/or 330 results in the computing devices described herein to calculate the weights, payloads, swung payloads, and other metrics described herein to determine whether the combination of the selected elements result in inappropriate or unacceptable limits on the weights, payloads, swung payloads, and other metrics and/or determine a plurality of tools 342 that qualify based on the selections made at the interface elements 310, 312, 314, 316, 318, 320, 322, 324, 326, 328, and/or 330.

The tools that qualify as being candidates based on the selections made at the interface elements 310, 312, 314, 316, 318, 320, 322, 324, 326, 328, and/or 330 are presented in the candidate tool list 336 as candidate tools. Further, interface elements 404, 406, 408, 410, 414, and/or 416 are considered when qualifying any tools as being candidates based on the selections made at these interface elements and are used to determine whether the tools are presented in the candidate tool list 336 as candidate tools. In one example, those candidate tools that do not meet the weights, payloads, swung payloads, and other metrics or are less compatible based on the weights, payloads, swung payloads, and other metrics, are presented in the candidate tool list 336 using different colors such as red, orange, or yellow to indicate that those tools are less compatible. Further, those candidate tools that do meet the weights, payloads, swung payloads, and other metrics or are less compatible based on the weights, payloads, swung payloads, and other metrics, are presented in the candidate tool list 336 using different colors such as blue or green to indicate that those tools are compatible or at least more compatible. A user selects one of the candidate tools listed in the candidate tool list 336, and that selected candidate tool is presented as the tool within the tool information window 402 with associated metrics included within the machine payload evaluation window 412 and/or the machine swung load evaluation window 418 (along with other widows described herein). The presentation of the parameters of the selected tool form the candidate tool list 336 in the windows 402, 412, 418 of FIG. 4 provides the user with the ability to see how well the tool fits with the machine as to weights, payloads, swung payloads, and other metrics.

The machine swung load evaluation window 418 of the GET selection tab 304 further includes parameters defining a swung weight at a rated payload as depicted in FIG. 4. The swung weight at the rated payload is determined for both a payload of a standard lift link machine and a payload for a high lift link machine. If the swung weight is too great, the stability of the machine may be compromised such that the machine tips forward due to the extra weight at the front of the machine.

In one example, the swung weight at the rated payload includes values of 142,610 lbs. and 135,260 lbs. for the payload of the standard lift link machine and the payload for the high lift link machine, respectively, as indicated in FIG. 4. The values for the swung weight at the rated payload exceed a limit. This is depicted in FIG. 4 as 614 lbs. and 7,965 lbs. above the limit, respectively. Stated another way, the limits are exceeded in the example of FIG. 4 as 0.4% and 5.9% above the limit, respectively. In one example, the values for the weight above or below the limits and the percentages above and below the limits are displayed to the user in different colors in order to bring these limits to the attention of the user. For example, the text is presented in green to indicate that the limits are below a first threshold where productivity is sacrificed but stability in the machine is well within safe parameters. Further, the text is presented in black to indicate that the limits are between the first threshold and a second threshold where nominal operation of the machine is maintained and an equilibrium between efficiency and stability are met. Still further, the text is presented in orange to indicate that the limits exceed the second threshold but not a third threshold where the stability of the machine is approaching unacceptable limits but efficiency in the form of increased capacity per load are capable. Still further, the text is presented in red to indicate that the limits exceed the third threshold indicating that the stability of the machine is at least at risk and operation results in the machine tipping under the weight of the load within the tool.

The machine swung load evaluation window 418 of the GET selection tab 304 further includes information regarding a maximum swung load given the selected machine, tool, and GETs. The maximum swung load for a standard lift linkage machine payload is designated in FIG. 4 as 152,073 lbs. The current parameters of the tool 342 and machine as selected by the user is 8,848 lbs. below the maximum swung load for a standard lift linkage machine payload, which equates to a 5.8% value below the maximum swung load for a standard lift linkage machine payload. Similarly, the maximum swung load for a high lift linkage machine payload is designated in FIG. 4 as 144,224 lbs. The current parameters of the tool 342 and machine as selected by the user is 999 lbs. below the maximum swung load for a high lift linkage machine payload, which equates to a 0.7% value below the maximum swung load for the high lift linkage machine payload. The values included in the machine swung load evaluation window 418 assist the user in identifying efficiencies, and safety levels of the tool 342 and machined that make up the machine system selected by the user. As the user changes a number of the selectable parameters available in FIGS. 3 and 4 as well as other selectable parameters described herein. In this manner, the metrics provided within the GET selection tab 304 depicted in FIG. 4 and other metrics described herein assists the user in understanding how changes to the tool 342, the GETs, the lift linkages, the machine, and other aspects of the overall machine system affects which tools 342 are recommended as candidate tools, and which tool 342 is compatible and function with the selected machine.

Figure 5:
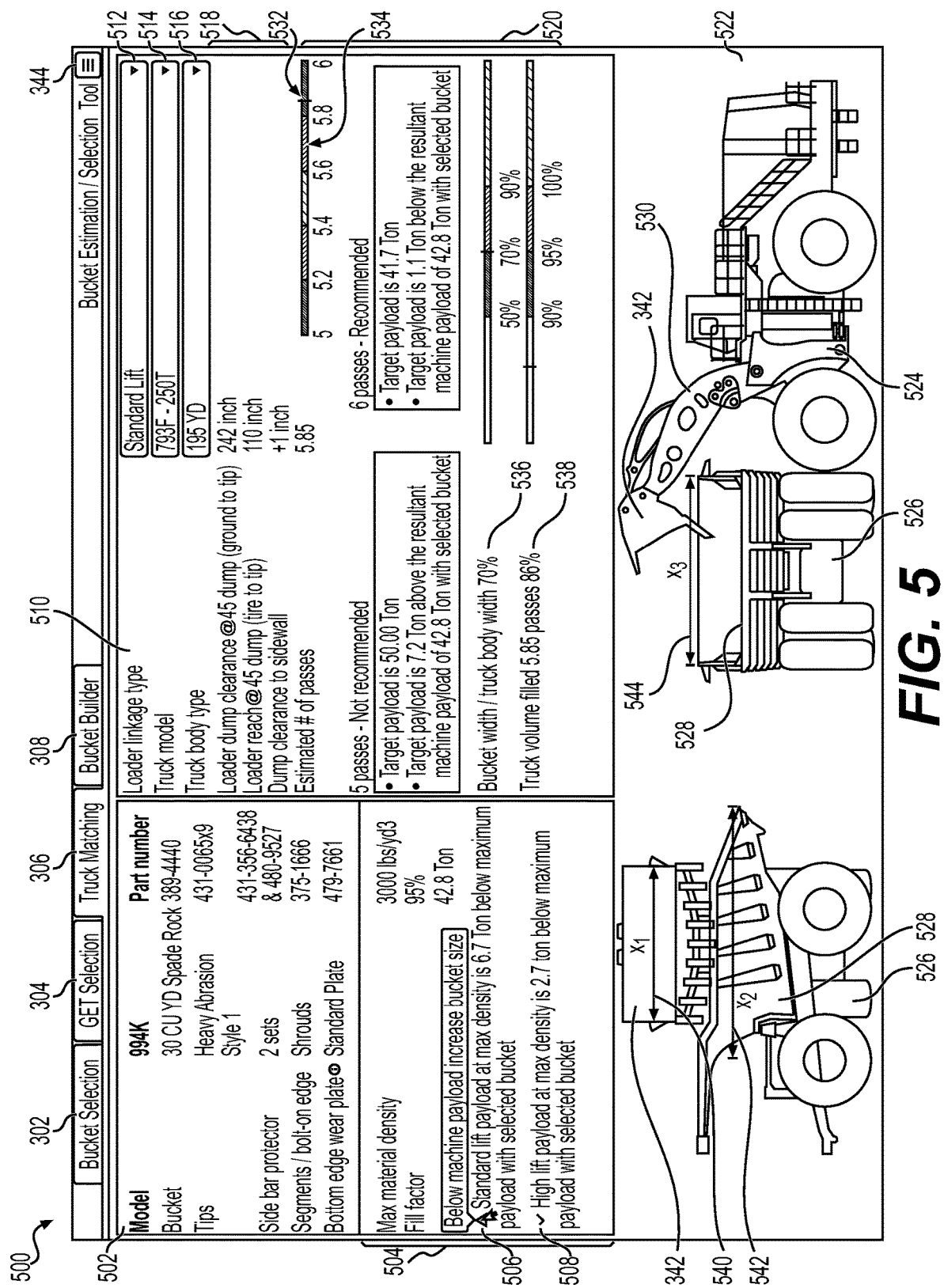
FIG. 5 is a schematic illustration of a GUI for selecting a matching hauling machine, according to an example of the principles described herein.

FIG. 5 is a schematic illustration of a GUI 500 for selecting a matching hauling machine, according to an example of the principles described herein. A truck matching tab 306 of the GUI 500 includes a machine system information window 502 that includes information regarding the user-selected model of the machine, the tool, the GETs, and their respective names and part numbers selected at FIGS. 3 and 4. Providing this information in the machine system information window 502 ensures to the user that their selections have been processed and propagated to the truck matching tab 306.

The truck matching tab 306 of FIG. 5 includes a machine payload evaluation window 504 that includes information similar to the machine payload evaluation window 412 of FIG. 4. Specifically, the machine payload evaluation window 504 of FIG. 5 includes information regarding a maximum material density for the application the user designated at the application selection interface element 312 of FIG. 3. The machine payload evaluation window 504 of FIG. 5 also includes a designation of a fill factor as indicated by the user at the fill factor selection interface element 414 of FIG. 4. Further, the machine payload evaluation window 504 includes a number of recommendations and/or warnings 506, 508 similar to the recommendations and/or warnings provided by the machine payload evaluation window 412 described herein. In the example of FIG. 5, the recommendations and/or warnings 506, 508 also includes a notification displayed when a cursor is hovered over the recommendations and/or warnings 506, 508 to assist the user in understanding what actions may be taken to reach an equilibrium of efficiency through selection of a large enough tool 342 and not overburdening the machine system.

The truck matching tab 306 of FIG. 5 also includes a truck matching selection window 510. The truck matching selection window 510 includes a loader linkage type selection interface element 512 where the user designates a type of linkage the machine onto which the tool 342 is to be coupled. The machine onto which the tool 342 is to be coupled is referred to herein as a loading machine 524 or a loader. In some examples, the loading machine 524 interfaces with other machines including, for example, a hauling machine 526 into which the loading machine 524 deposits material for hauling the material to another location. The hauling machine 526 includes, for example, a dump truck that includes a bed 528 into which the material is deposited by the loading machine 524 dumping contents within the tool. In one example, the loading machine 524 includes the standard lift linkage or the high lift linkage used to couple the tool 342 to the loading machine. Thus, in the loader linkage type selection interface element 512, the user selects, for example, either a standard lift linkage or a high lift linkage as the type of linkage the loading machine 524 includes. In one example, a machine preview window 522 is displayed in the GUI 500 of FIG. 5 to display relative sizes and positions of the tool 342, loading machine 524, hauling machine 526 and bed 528 to assist in the user visually understanding how a selected tool 342 and/or loading machine 524 physically match sizes and dimensions of a selected hauling machine 526 and/or bed 528. The machine preview window 522 dynamically changes as the user selects different tools 342, loading machines 524, hauling machines 526, and beds 528 as provided throughout the GUIs 300, 400, 500, 600 and their respective selection points described herein. In this manner, the machine preview window 522 assists the user in understanding how the various selected items fit together at a worksite where the items will be utilized.

The truck matching selection window 510 also includes a hauling machine model selection interface element 514. The hauling machine model selection interface element 514 allows the user to select a hauling machine 526 the user intends to use in connection with the operation of the loading machine. In the example of FIG. 5, the hauling machine 526 selected has a model number of 793F-250T. Further, a hauling machine 526 body type is selected via a hauling machine body type selection interface element 516 that defines parameters of the body of the hauling machine. The body types include characteristics such as, for example, a shape of a bed 528 of the hauling machine, a height of the hauling machine, heights of the side walls of the bed 528 of the hauling machine, and capacity of the bed 528 of the hauling machine, among other parameters that influence the selection of parameters of the loading machine 524 and/or the tool 342 of the loading machine. Examples of types of bodies of the hauling machine 526 include gated and gateless beds, tapering sidewalls, tail extensions, sideboards, tumble bars, rock boxes, rock shedders, and other characteristics that maintain rated payload, reduce spillage, and improve hauling efficiencies.

As selections are made via the selection interface elements 512, 514, 516 of the truck matching selection window 510, a visual representation of the loading machine 524 and the hauling machine 526 is presented in a truck matching preview window 522 where the hauling machine 526 is depicted juxtaposition the loading machine 524 in an attitude of the loading machine 524 using the tool 342 to dump material into the bed 528 of the hauling machine 526. As the user makes changes to the selection interface elements 512, 514, 516, the presentation of the loading machine 524, the tool 342, the hauling machine 526, and the bed 528 also visually change according to the selections made. In one example, as depicted in FIG. 5, the hauling machine 526 and the loading machine 524 are presented in a plurality of orientations such that a user visually understands how the proposed loading machine 524 (including is linkage and tool) interact and fit with the hauling machine. In this manner, the user fully understands how the selected parameters of the tool 342 fit with the application in which the user intends to use the tool. The truck matching preview window 522 includes an accurate and true-to-life representation of how the tool 342 interfaces with the bed 528 of the hauling machine 526 given the linkage type of the loading machine 524 and relative sizes, heights, and dimensions of the hauling machine 526 and loading machine. For example, the truck matching preview window 522 of FIG. 5 depicts a standard lift linkage included on the loading machine 524 along with a tool 342 that reaches over the edge of the bed 528 of the hauling machine. The tips of the tool 342 including any GETs coupled thereto may not clear the edge of the bed 528 of the hauling machine but will when the tool 342 is not in a dumping state. Further, the tips of the tool 342 including any GETs coupled thereto do not reach to the bottom of the bed 528 of the hauling machine, and therefore do not obstruct the dumping of material from the tool 342 into the bed. These and other observations are identified by the user via the truck matching preview window 522 of FIG. 5 to confirm to the user that the selected tool 342 will function as intended in connection with the loading machine 524 and hauling machine 526 the user intends to use.

The truck matching selection window 510 further includes a number of dimension indicators 518 including a number of dimensions between the loading machine, the hauling machine, and the tool 342 as depicted in the truck matching preview window 522 of FIG. 5. For example, the dimension indicators 518 include a loader dump clearance with the tool 342 at a 45 degrees tip angle as measured from the ground to the tip. In the example of FIG. 5, the loader dump clearance is 242 inches (in.). Further, a loader reaches with the tool 342 at a 45 degrees tip angle as measured from the front of a front tire of the loading machine 524 to the tip of the tool 342 is also included in the dimension indicators 518 and is 110 inches. Still further, the dimension indicators 518 include a value of the dump clearance of the tool 342 to a sidewall of the bed 528 of the hauling machine. This dump clearance is indicated in FIG. 5 as a positive 1 in. of clearance indicating that the tool 342 clears the sidewall of the bed 528 of the hauling machine 526 with an extra inch of clearance.

The truck matching selection window 510 further includes efficiency indicators 520. The efficiency indicators 520 includes an estimated number of passes a loading machine 524 takes to fill a bed 528 of the associated hauling machine 526. The volume of material that is contained within the tool 342 of the loading machine 524 is a fraction of the volume of material that is contained within the bed 528 of the hauling machine 526 given that the volume of the tool 342 is smaller than the volume of the bed 528. For this reason, the loading machine 524 makes a plurality of passes from a pile or other source of material where the loading machine 524 fills the tool 342 with the material to the hauling machine 526 where the loading machine 524 dumps the material from the tool 342 into the bed 528 of the hauling machine 526.

In the example of FIG. 5, the estimated number of passes are indicated as 5.85 passes. In this example, the volume of the tool 342 is not an exact integer or whole number relative to the volume of the bed 528 of the hauling machine 526. Thus, the loading machine 524 makes six (6) total trips between the source of the material to the hauling machine 526 in order to fill the bed 528 of the hauling machine 526. However, an inefficiency of approximately 0.15 passes exists based on the selection of the tool 342 and the loading machine 524 at FIGS. 3 and 4, a selected linkage 530 of the loader linkage type selection interface element 512, and a selection of the hauling machine 526 and body type of the hauling machine 526 selected at the machine model selection interface element 514 and the hauling machine body type selection interface element 516, respectively. It is a goal of the user to ensure that the value of the estimated number of passes reaches a closest whole integer. An efficiency scale 534 is presented as part of the efficiency indicators 520 of the truck matching selection window 510 to assist a user in visually understanding how close to a whole integer the number of passes is. An indicator 532 is presented along the length of the efficiency scale 534 to visually represent the 5.85 passes as indicated in the example of FIG. 5 to demonstrate how close to the whole numbers of 5 and 6 the efficiency value is. The user may change any of the selectable parameters described herein in connection with FIGS. 3 through 5 among other user-selectable parameters and selection interface elements described herein.

Further, it is noted that it is rare to find a perfect match between the tool 342, the loading machine 524, the linkage 530, the hauling machine 526, and the body type of the hauling machine 526. However, it is possible to limit any extreme inefficiencies by adjusting parameters until the indicator 532 of the efficiency scale 534 is closest to the five (5) or the six (6) of the efficiency scale 534 and farthest away from a middle value such as those values between 5.4 and 5.6.

The efficiency indicators 520 also include pass recommendations that include designations such as "5 passes—Not recommended" and "6 passes—Recommended" to indicate to the user what number of passes an operator of the loading machine 524 should make in filling the bed 528 of the hauling machine 526. In the example of FIG. 5, the "5 passes—Not recommended" includes reasons as to why this number of passes are not recommended and includes, for example, indications of a target payload and how far above the resultant payload of the loading machine 524 with the selected tool 342 is relative to the target payload. In this example, the target payload is the payload of the hauling machine 526 at 5 passes in order to fill the bed 528 of the hauling machine 526. The example of FIG. 5 indicates that the target payload is 50.00 Ton. However, with 5 passes, the loading machine 524 delivers and dumps a maximum of 42.8 Ton into the bed 528 of the hauling machine 526. Therefore, the inefficiency of utilizing 5 passes is approximately 7.2 Ton which is so inefficient that it is worth the operator's time and fuel to deliver another tool load of material to the bed 528 of the hauling machine 526 using 6 passes as described below. In other words, the above example would require an operator to fit 7.2 Ton into the 5 tool-fills of the tool 342 in order to meet the target payload of 50.00 Ton. This is impossible or creates too much strain on the loading machine 524 based on the payload capacity of the loading machine 524. In instances where a user has a goal to have 5 passes to fill the bed 528 of the hauling machine 526, the user selects a larger tool 342 keeping in mind that the payload of loading machine 524 should not be exceeded. The user also selects a bigger loading machine 524 and/or a smaller hauling machine 526 to meet this 5-pass goal.

Thus, conversely, the "6 passes—Recommended" includes reasons as to why this number of passes are recommended and includes, for example, indications of a target payload and how far below the resultant payload of the loading machine 524 with the selected tool 342 is relative to the target payload. In this example, the target payload is the payload of the hauling machine 526 at 6 passes in order to fill the bed 528 of the hauling machine 526. The example of FIG. 5 indicates that the target payload is 41.7 Ton. However, with 6 passes, the loading machine 524 delivers and dumps a maximum of 42.8 Ton into the bed 528 of the hauling machine 526 with 6 passes. Therefore, the efficiency of utilizing 6 passes is approximately 1.1 Ton which is so efficient that it is worth the operator's time and fuel to deliver 6 tool loads of material to the bed 528 of the hauling machine 526 using 6 passes even though at least one of the 6 loads of material includes a smaller volume in order to ensure that the target payload is not exceeded.

In one example, the indicator 532 of the efficiency scale 534 is user-adjustable. In this example, the selection interface elements 512, 514, 516 of the truck matching selection window 510 displays other machine linkages, linkages of the hauling machine 526, and body types of the hauling machine 526 as the user moves the indicator 532 of the efficiency scale 534 to other positions along the efficiency scale 534.

The efficiency indicators 520 of the truck matching selection window 510 further include a tool/bed fit metric 536 that indicates a ratio of the tool (e.g., bucket) width to the hauling machine body width. The tool/bed metric 536 divides the width of the tool 342 by the width of the bed 528 or body of the hauling machine 526 and multiply that number by 100 to obtain a percentage. The percentage represents the ratio of the tool/bed fit metric. In the example of FIG. 5, the tool/bed fit metric 536 is 70%, and an associated ratio scale is included to visually depict the percentage to the user via the GUI 500. The tool/bed fit metric 536 is useful to the user in understanding whether the tool 342 is too large and/or too small for the opening of the bed 528 of the hauling machine 526. In instances where the tool 342 is too large for the opening of the bed 528, material deposited into the bed 528 may spill over the ends of the bed 528 causing material that has been moved by the loading machine 524 to be lost to the ground underneath the hauling machine 526 and requiring cleanup afterwards. Further, in instances where the tool 342 is too small for the opening of the bed 528, this indicates to the user that the tool 342 and/or the loading machine 524 are too small for the size of the hauling machine 526 and that a larger machine system including a larger tool 342 and loading machine 524 prove more efficient in filling the hauling machine 526 in an efficient manner and using fewer passes to do so. In one example, arrows 540, 542, 544 and/or values $X_1$, $X_2$, $X_3$ indicating the dimensions of the loading machine 524, tool 342, hauling machine 526, and/or bed 528 are presented to the user within the machine preview window 522 to indicate to the user exact dimensions of these elements. This further assists the user in understanding how the loading machine 524, tool 342, hauling machine 526, and/or bed 528 physically fit together if used together at a worksite.

The efficiency indicators 520 of the truck matching selection window 510 further includes a hauling truck volume filled indicator 538. As described herein, the number of passes indicated within the efficiency indicators 520 (e.g., 5.85 as indicated in FIG. 5) defines and estimated number of passes the loading machine 524 makes between the material supply and the hauling machine 526 to fill the bed 528 of the hauling machine 526 to its maximum tonnage. Further, the volumetric limit of the hauling machine 526 at the number of estimated passes (e.g., 5.85 as indicated in FIG. 5) is also indicated. In the example of FIG. 5, the hauling truck volume filled indicator 538 indicates that 54% of the total volume of the hauling machine 526 is filled after 5.85 passes of the loading machine 524. As the user selects different tools 342, loading machines 524, hauling machines 526, and beds 528 as provided throughout the GUIs 300, 400, 500, 600 and their respective selection points described herein, the user is able to select these elements such that both payloads and volumes of these elements are matched to assist in a more efficient overall material moving process provided by the loading machine 524 and the hauling machine 526.

In the examples described herein, the user already possesses one or more of the tools 342, loading machines 524 (with different linkages 530), hauling machines 526 and beds 528. In this example, the user may utilize the GUIs 300, 400, 500, 600 described herein to determine how the payloads and volumes of these elements the presently have match to one another. Thus, although the examples described herein are described in connection with the selection of a tool 342 and determining a fit of the tool 342 among other elements, the GUIs 300, 400, 500, 600 are used to determine fitness of any of the elements described herein.

Figure 6:
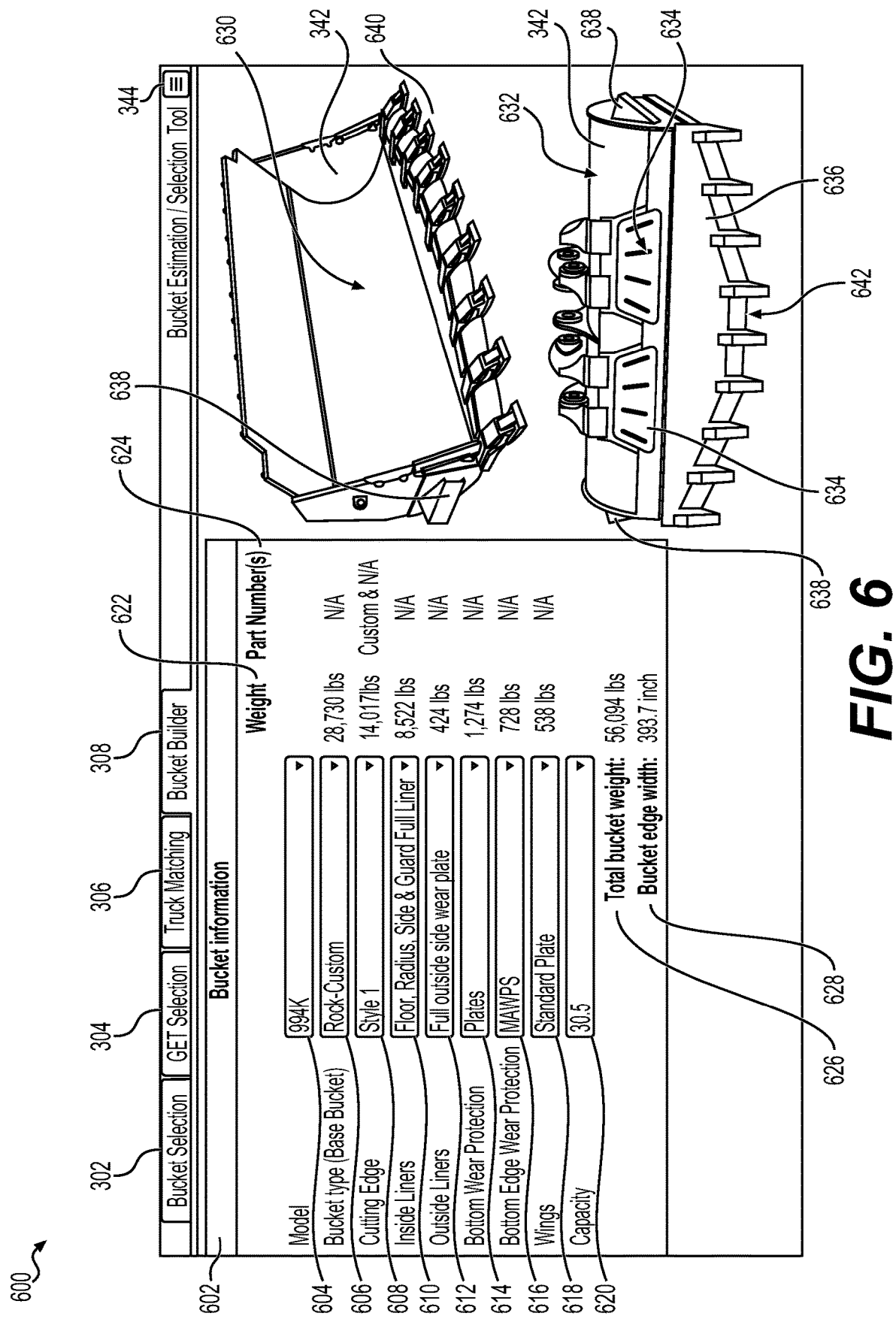
FIG. 6 is a schematic illustration of a GUI for selecting parts associated with a tool, according to an example of the principles described herein.

FIG. 6 is a schematic illustration of a GUI 600 for selecting parts associated with a tool 342, according to an example of the principles described herein. The GUI 600 includes a bucket builder tab 308 that is used in conjunction with any of the GUIs 300, 400, 500 described herein to further define the tool 342. In one example, the bucket builder tab 308 is used to create a custom tool.

The bucket builder tab 308 of the GUI 600 of FIG. 6 includes a bucket information window 602. The bucket information window 602 includes a number of selection interface elements 604, 606, 608, 610, 612, 614, 616, 618, 620 that allow a user to enter information regarding elements of the tool 342. In one example, the selection interface elements 604, 606, 608, 610, 612, 614, 616, 618, 620 include drop-down menus that allows a user to select from a number of elements listed therein. Further, in one example, a search engine is provided in association with the selection interface elements 604, 606, 608, 610, 612, 614, 616, 618, 620 to allow a user to search for a model or part number. Further, in one example, the selection interface elements 604, 606, 608, 610, 612, 614, 616, 618, 620 include images of the respective models and parts for the user to utilize as a way to confirm the model or part they have selected. In one example, the user may desire to replace or purchase a tool 342 for a machine they currently own or replace elements of the tool 342 and having an image of the models and parts assists the user in pictorially identifying which models and parts they currently own and seek to replace. In one example, the GUI 600 may not allow a user to enter data in other fields of the GUI 600 until the user selects from elements within one or more of the selection interface elements 604, 606, 608, 610, 612, 614, 616, 618, 620. This ensures that information used to select other elements serves as a basis for providing a user with a list of candidate models and parts that are applicable to the tool 342 for which the user is seeking to purchase.

As a user makes selections via the selection interface elements 604, 606, 608, 610, 612, 614, 616, 618, 620, at least one image of the tool 342 is depicted in a tool preview window 640 that functions similarly to the tool preview window 332 of FIG. 3. This allows the user to visualize the selected parameters as the user builds the tool 342 and confirms that the selection has been made and/or is a correct or intended selection.

Further, as the user makes selections via the selection interface elements 604, 606, 608, 610, 612, 614, 616, 618, 620, the values presented in the tool information window 402, the machine payload evaluation window 412, and/or machine swung load evaluation window 418 of FIG. 4 are adjusted to reflect different weights that affect the payloads, swung loads, and other metrics in order to aid the user in better understanding how these changes affect these metrics and ultimately the tool 342 that is selected.

A model selection interface element 604 similar to the model selection interface element 310 of FIG. 3, when selected, allows for the input of a model of a loading machine 524. A tool type selection interface element 606 that allows the user to select a base type of tool (e.g., bucket) is also included in the bucket information window 602. In one example, a user selects a pre-defined or custom tool, and, in the example of FIG. 6, is selected as a custom rock bucket.

The bucket information window 602 of the bucket builder tab 308 also includes a cutting-edge selection interface element 608. The cutting-edge selection interface element 608 allows the user to select a cutting edge 642 of the tool 342. Examples of a cutting edge of the tool 342 include, for example, a spade edge as depicted in FIG. 6 as well as a flat edge, a serrated edge, and a blank edge, among other types of edges.

The bucket information window 602 of the bucket builder tab 308 also includes an inside liner selection interface element 610 that allows a user to select liners such as additional plating that is placed on the interior surfaces 630 of the tool 342 to provide additional structural support and abrasion resistance. The inside liners include, for example, liners that are coupled to the floor, the radii, the side walls, and other interior surfaces 630 of the tool 342.

The bucket information window 602 of the bucket builder tab 308 also includes an outside liner selection interface element 612 that allows a user to select liners such as additional plating that is placed on the exterior surfaces 632 of the tool 342 to provide additional structural support and abrasion resistance. The outside liners include, for example, liners that are coupled to the floor, the radii, the side walls, and other exterior surfaces 632 of the tool 342.

A bottom wear protection selection interface element 614 is also included in the bucket information window 602 of the bucket builder tab 308. Via the bottom wear protection selection interface element 614, the user selects from a number of different types and shapes of plates 634 that are affixed to a bottom portion of the tool 342 in order to provide additional structural support and abrasion resistance as the bottom of the tool 342 contacts a surface.

The bucket information window 602 of the bucket builder tab 308 also includes a bottom edge wear protection selection interface element 616 that allows a user to select from a number of different types and shapes of additional plating that are placed on the bottom cutting surfaces 636 of the tool 342 to provide additional structural support and abrasion resistance. Further, a wings selection interface element 618 is included within the bucket information window 602 to allow a user to select from a number of different types and shapes of wings 638. The wings assist in moving material away from the tool 342 as the tool 342 is used to dig into material.

The bucket information window 602 of the bucket builder tab 308 also includes a capacity selection interface element 620. A user may desire a specific capacity of tool 342 in order to meet a desired payload and to make the loading machine 524 as efficient as possible. In the example of FIG. 6, the capacity of the tool is set as 30.5 which designates a volume such as cubic inches ($in^3$), for example.

A designation of the weight 622 of the tool 342 and all the constituent parts is included in the bucket information window 602 to inform the user of how the weight of the tool 342 changes as different elements are added and removed. The values presented in the weight 622 column change as the user changes the selections in the selection interface elements 604, 606, 608, 610, 612, 614, 616, 618, 620. Further, a total tool (e.g., bucket) weight 626 is presented at the bottom of the weight 622 column, and this value is also dynamically updated as the user makes selections via the selection interface elements 604, 606, 608, 610, 612, 614, 616, 618, 620. A tool (e.g., bucket) edge width 628 is also included in the bucket information window 602. The tool edge width 628 indicates the width of the tool 342 and dynamically changes as the user adds elements such as wings 638 via the wings selection interface element 618 and/or adjusts the capacity of the tool 342 via the capacity selection interface element 620. This metric is useful to the user when comparing the width of the tool 342 to dimensions of the loading machine 524, hauling machine 526, and/or bed 528 as described above in connection with the GUI 500 of FIG. 5. Further, in as much as is applicable, part numbers 624 are displayed for the respective elements selected via the selection interface elements 604, 606, 608, 610, 612, 614, 616, 618, 620.

Once the tool 342 has been built via the bucket builder tab 308, the information defining the user's selections at the bucket builder tab 308 are included in the bucket selection tab 302, the GET selection tab 304, and/or the truck matching tab 306. In this manner, the user begins the processes described herein by first providing a number of selections via the bucket builder tab 308, and moving to the bucket selection tab 302, the GET selection tab 304, and/or the truck matching tab 306 to complete the matching processes described herein. Further, in one example, the user designs their own tool 342 and quickly generate a quote in order to buy the custom, user-design tool 342.

Figure 7:
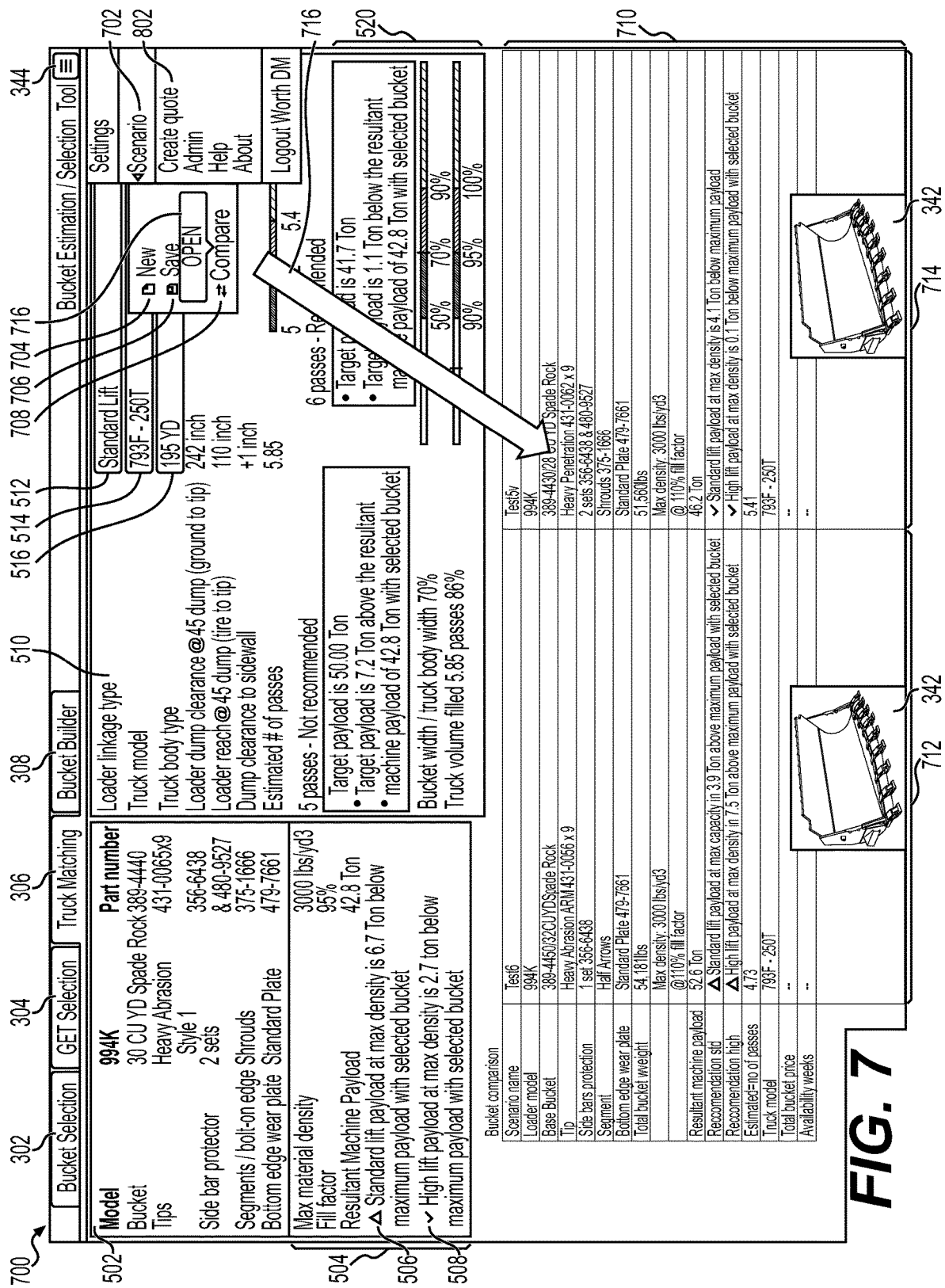
FIG. 7 is a schematic illustration of a GUI for comparing a number of tools associated with the GUI of FIG. 5, according to an example of the principles described herein.

FIG. 7 is a schematic illustration of a GUI 700 for comparing a number of tools associated with the GUI of FIG. 5, according to an example of the principles described herein. A user may desire to compare two or more tools 342 when deciding which tool to purchase. As depicted in FIG. 7, a tool comparison window 710 is presented where a first window 712 and a second window 714 are presented side-by-side to allow the user to compare the parameters of the tools 342. In one example, the menu selection 344 includes a settings selection to adjust a number of settings associated with the GUIs 300, 400, 500, 600. Further, the menu selection 344 includes a scenario selection 702 to allow a user to begin a new scenario or open a saved scenario. A quote creation selection 802 is also included to allow a quote for a tool 342 created based on user input provided at the GUIs 300, 400, 500, 600. Further, other menu selections include an administrative selection to allow administrators access to certain functions of the GUIs 300, 400, 500, 600 and a help selection to provide assistance to a user who needs help operating the functions of the GUIs 300, 400, 500, 600. Still further an about selection is provided in the menu selection 344 to provide information related to the programming supporting the GUIs 300, 400, 500, 600. Also, a logout selection is provided in the menu selection 344 for logging out of the tool building program supporting the GUIs 300, 400, 500, 600.

Turning to the scenario selection 702, number of selectable operations including a "new" selection 704 for creating a new tool build session, a "save" selection 706 for saving a tool build session, an "open" selection 716 for opening a previously-saved tool build session, and a "compare" selection 708 for comparing two or more tools 342 is included. In one example, the compare selection 708 is selected by either a click of a mouse or via a combination of key strokes such as, for example, control+shift+c. Once selected, a plurality of tools 342 with different parameters are displayed as indicated by arrow 716 for the user to visually compare the tools 342. In one example, a user selects two or more tools 342 from the tool candidate list 336 of the GUI 300 of FIG. 3 by selecting a first tool, holding down a function button such as the shift button, and selecting a number of additional tools 342. The user then uses the control+shift+c function or use selections via the mouse to access the compare selection 708 of the menu selection 344. Doing so will display the tool comparison window 710 in any of the GUIs 300, 400, 500, 600 including the GUI 500 including the truck matching tab 306 as depicted in FIG. 7.

The tool comparison window 710 includes visual depictions of the tools 342 being compared to allow the user to visually recognize any differences between the tools 342. Further, parameters and metrics such as those listed in the tool comparison window 710 of FIG. 7, among others, are displayed. Scenario names are assigned to each of the compared tools such as the "Test6" and "Test5v" scenarios names depicted in FIG. 7. When compared, the tools 342 depicted in the first window 712 and the second window 714 include parameters obtained via the other GUIs 300, 400, 500, 600 as described herein in order to assist the user in directly comparing the tools 342 without moving between the tabs 302, 304, 306, 308 or opening new or saved scenarios. In this manner, the user is able to conveniently compare two or more tools 342 when considering purchases.

Figure 8:
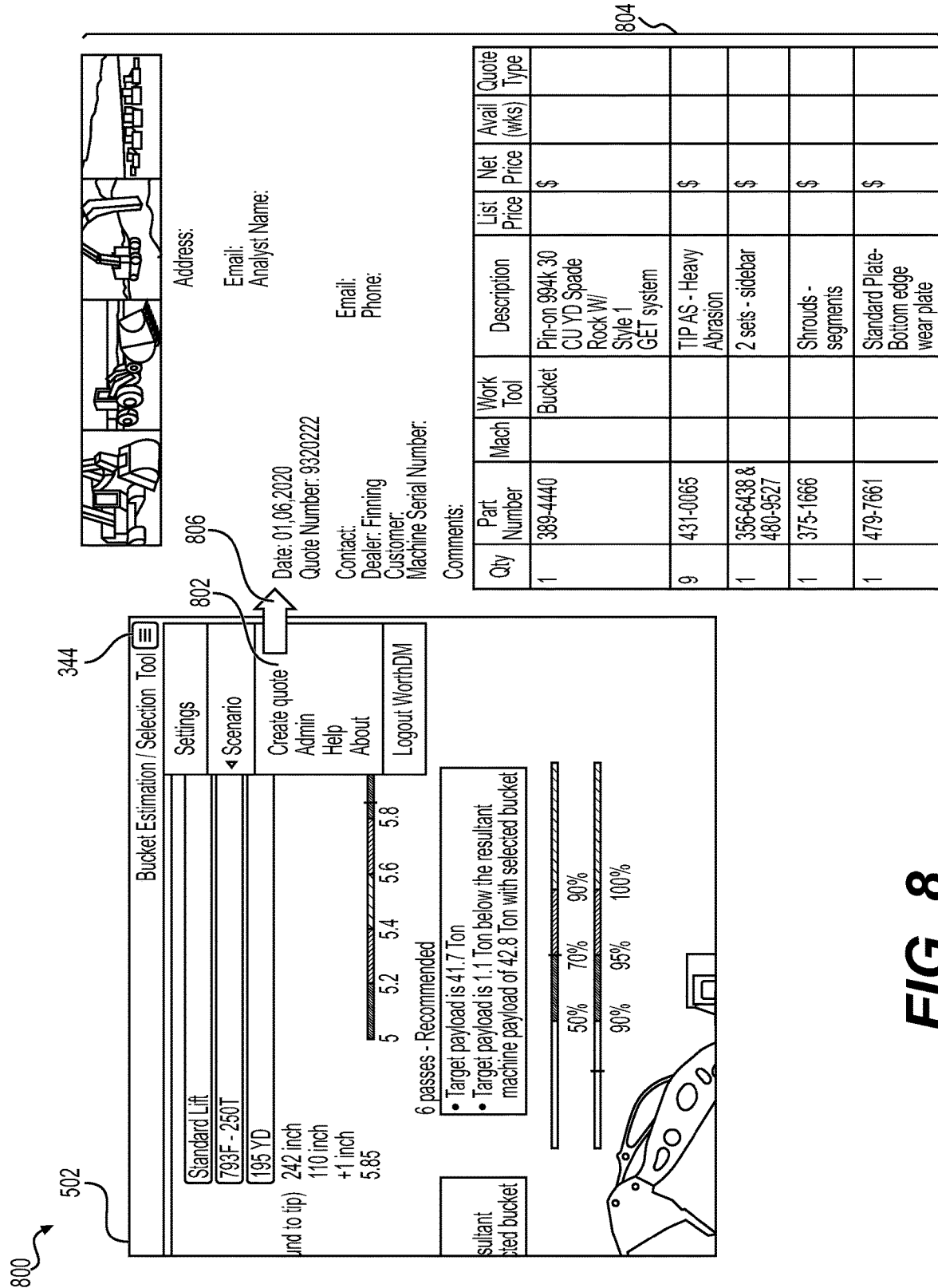
FIG. 8 is a schematic illustration of the GUI of FIG. 5 and a quote created from a quote creation selection, according to an example of the principles described herein.

FIG. 8 is a schematic illustration of a GUI 800 such as the GUI 500 of FIG. 5, and a quote 804 created from the quote creation selection 802, according to an example of the principles described herein. The GUI 800 depicted in FIG. 8 is a portion of the GUI 500 including the truck matching tab 306 as depicted in FIG. 5. However, access to the quote creation selection 802 is made from any of the GUIs 300, 400, 500, 600 and respective tabs 302, 304, 306, 308.

The quote creation selection 802 is accessed via the menu selection 344 as described herein. Once selected, the GUIs 300, 400, 500, 600 generate the quote 804 as indicated by arrow 806. The quote 804 includes the parameters selected by the user throughout the GUIs 300, 400, 500, 600 along with part numbers, associated machines 524, 526, a type of work tool, a description of the part, a listing price, a net price, an availability date, and a quote type, among other information that is presented in a quote 804 to the user. In this manner, the user obtains confirmation that a tool 342 built by the user has been reviewed and allows the user as a prospective buyer to see the costs that will be involved in the purchase of the tool 342. Many businesses provide services that cannot have an upfront price because the costs involved can vary. This can be due to the materials used, the number of elements selected for inclusion with the tool 342 throughout the GUIs 300, 400, 500, 600, and other considerations that differ depending on the individual needs of the customer, and the necessary time, costs, and manpower to physically build the tool 342. Therefore, quote 804 provides the user with an estimate of those costs and time frames. However, because the user has entered the desired parameters via the GUIs 300, 400, 500, 600 regarding the various elements that affect the price, the user has more control in making decisions. Further, the recommendations, warnings, and metrics provided by the GUIs 300, 400, 500, 600 as described herein provide guidance for the user when making decisions. In this manner, the user is able to have autonomy while still being supported by the manufacturer of the tool in making these decisions.

Although the GUIs 300, 400, 500, 600 described herein are used to describe a process of selecting and matching a tool 342, the processes are employed when making similar decisions regarding which GETs to purchase, which linkages 530 to purchase, and/or which machines 524, 526 to purchase. The GUIs 300, 400, 500, 600 described herein provide knowledge to a user regarding different aspects of the tool 342 to be ordered, how the tool 342 fits with a selected machine(s) 524, 526, different ground engaging tools (GETs) that fit with the tool 342, different parameters of the tool 342 at all stages of a build of the tool 342, and different load metrics of the tool 342 and the machine(s) 524, 526 at all stages of a build of the tool 342, among other types of information. Further, the GUIs 300, 400, 500, 600 provide knowledge to a user regarding how the tool 342 and machine(s) 524, 526 operate with other machine(s) 524, 526, different machine(s) 524, 526 specifications including, for example, dump clearances, reach, width, maximum payload of the tool, maximum machine payloads, maximum swung loads, machine tipping loads, and a recommended number of passes to achieve a payload of the hauling machine, among many other parameters.

Figure 9:
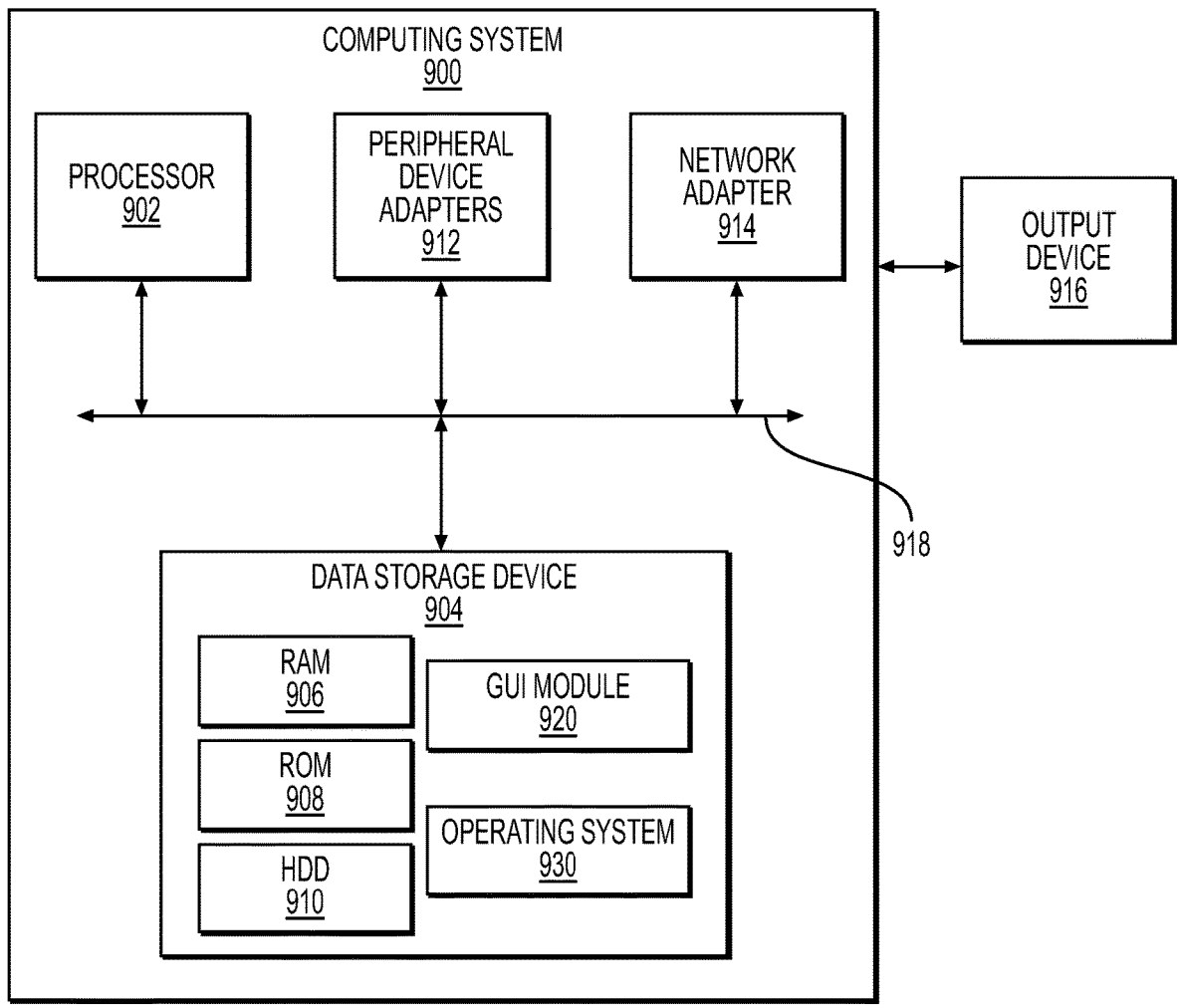
FIG. 9 is a block diagram of a computing system for execution of the GUI, according to an example of the principles described herein.

FIG. 9 is a block diagram of a computing system 900 for execution of the GUIs 300, 400, 500, 600 described herein. The computing system 900 is implemented in an electronic device. Examples of electronic devices include servers, desktop computers, laptop computers, personal digital assistants (PDAs), mobile devices, smartphones, gaming systems, and tablets, among other electronic devices.

The computing system 900 is utilized in any data processing scenario including, stand-alone hardware, mobile applications, through a computing network, or combinations thereof. Further, the computing system 900 is used in a computing network, a public cloud network, a private cloud network, a hybrid cloud network, other forms of networks, or combinations thereof. In one example, the methods provided by the computing system 900 are provided as a service over a network by, for example, a third party. In this example, the service includes, for example, the following: a Software as a Service (SaaS) hosting a number of applications; a Platform as a Service (PaaS) hosting a computing platform including, for example, operating systems, hardware, and storage, among others; an Infrastructure as a Service (IaaS) hosting equipment such as, for example, servers, storage components, network, and components, among others; application program interface (API) as a service (APIaaS), other forms of network services, or combinations thereof. The present systems are implemented on one or multiple hardware platforms, in which the modules in the system can be executed on one or across multiple platforms. Such modules can run on various forms of cloud technologies and hybrid cloud technologies or offered as a SaaS (Software as a service) that can be implemented on or off the cloud. In another example, the methods provided by the computing system 900 are executed by a local administrator.

To achieve its desired functionality, the computing system 900 includes various hardware components. Among these hardware components include a processor 902, a data storage device 904, at least one peripheral device adapter 912, and a network adapter 914. These hardware components are interconnected through the use of a number of busses and/or network connections such as via a bus 918.

The processor 902 includes the hardware architecture to retrieve executable code from the data storage device 904 and execute the executable code. The executable code, when executed by the processor 902, causes the processor 902 to implement at least the functionality according to the methods of the present specification described herein. In the course of executing code, the processor 902 receives input from and provide output to a number of the remaining hardware units.

The data storage device 904 stores data such as executable program code that is executed by the processor 902 or other processing device. As described herein, the data storage device 904 specifically stores computer code representing a number of applications that the processor 902 executes to implement at least the functionality described herein.

The data storage device 904 includes various types of memory modules, including volatile and nonvolatile memory. For example, the data storage device 904 of the present example includes Random Access Memory (RAM) 906, Read Only Memory (ROM) 908, and Hard Disk Drive (HDD) memory 910. Many other types of memory are also utilized, and the present specification contemplates the use of many varying type(s) of memory in the data storage device 904 as may suit a particular application of the principles described herein. In certain examples, different types of memory in the data storage device 904 are used for different data storage needs. For example, in certain examples the processor 902 boots from ROM 908, maintains nonvolatile storage in the HDD memory 910, and executes program code stored in the RAM 906.

The data storage device 904 includes a computer readable medium, a computer readable storage medium, or a non-transitory computer readable medium, among others. For example, the data storage device 904 is, but not limited to, an electronic, magnetic, optical, electromagnetic, infrared, or semiconductor system, apparatus, or device, or any suitable combination of the foregoing. More specific examples of the computer readable storage medium include, for example, the following: an electrical connection having a number of wires, a portable computer diskette, a hard disk, a random-access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium is any tangible medium that can contain, or store computer usable program code for use by or in connection with an instruction execution system, apparatus, or device. In another example, a computer readable storage medium is any non-transitory medium that can contain or store a program for use by or in connection with an instruction execution system, apparatus, or device.

The peripheral device adapter 912 and the network adapter 914 act as hardware adapters in the computing system 900 to enable the processor 902 to interface with various other hardware elements, external and internal to the computing system 900. For example, the peripheral device adapter 912 provides an interface to input/output devices, such as, for example, an output device 916, a mouse, and/or a keyboard. The peripheral device adapter 912 also provides access to other external devices such as an external storage device, a number of network devices such as, for example, servers, switches, and routers, client devices, other types of computing devices, and combinations thereof.

The output device 916 is provided to allow a user of the computing system 900 to interact with and implement the functionality of the computing system 900. The peripheral device adapter 912 also creates an interface between the processor 902 and the output device 916, a printer, or other media output devices. The network adapter 914 provides an interface to other computing devices within, for example, a network, thereby enabling the transmission of data between the computing system 900 and other devices located within the network.

The computing system 900, when executed by the processor 902, displays the number of the GUIs 300, 400, 500, 600 along with any associated elements on the output device 916 (e.g., a display device) associated with the executable program code representing the number of applications stored on the data storage device 904. The GUIs 300, 400, 500, 600 include aspects of the executable code including those aspects described above and depicted in FIGS. 3 through 8. The GUIs 300, 400, 500, 600 display, for example, any executable function described herein. Additionally, via making a number of interactive gestures on the GUIs 300, 400, 500, 600 via the output device 916, a user builds and matches a tool 342. Examples of output devices 916 include a computer screen, a laptop screen, a mobile device screen, a personal digital assistant (PDA) screen, and a tablet screen, among other types of display devices.

The computing system 900 further includes a number of modules used in the implementation of the functions of the GUIs 300, 400, 500, 600 described herein. The various modules within the computing system 900 include executable program code that are executed separately. In this example, the various modules are stored as separate computer program products. In another example, the various modules within the computing system 900 are combined within a number of computer program products; each computer program product including a number of the modules. For example, the computing system 900 includes a GUI module 920 to, when executed by the processor 902, present the GUIs 300, 400, 500, 600 and receive a number of user inputs related to the plurality of selection interface elements as described herein.

The computing system 900 is programmed with one or more operating systems (OS) 930. The OS 930 includes OS/2, Java Virtual Machine, Linux, SOLARIS, UNIX, HPUX, AIX, WINDOWS, WINDOWS95, WINDOWS98, WINDOWS NT, AND WINDOWS2000, WINDOWS ME, WINDOWS XP, WINDOWS SERVER, WINDOWS 8, Mac OS X, IOS, ANDROID among other platforms. At least a portion of the OS 930 is disposed in the data storage device 904.

Figure 10:
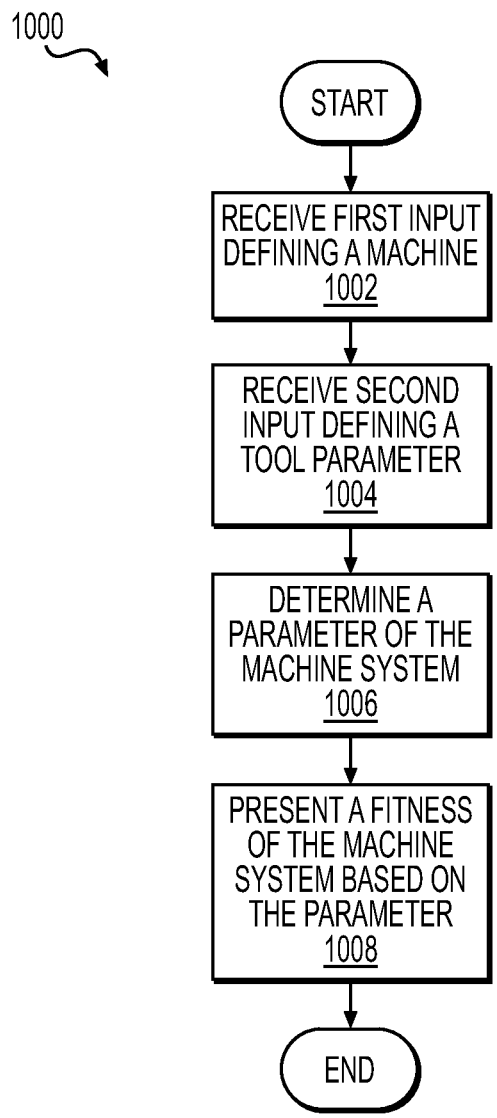
FIG. 10 is a flowchart showing a method of executing a GUI, according to an example of the principles described herein.
Figure 11:
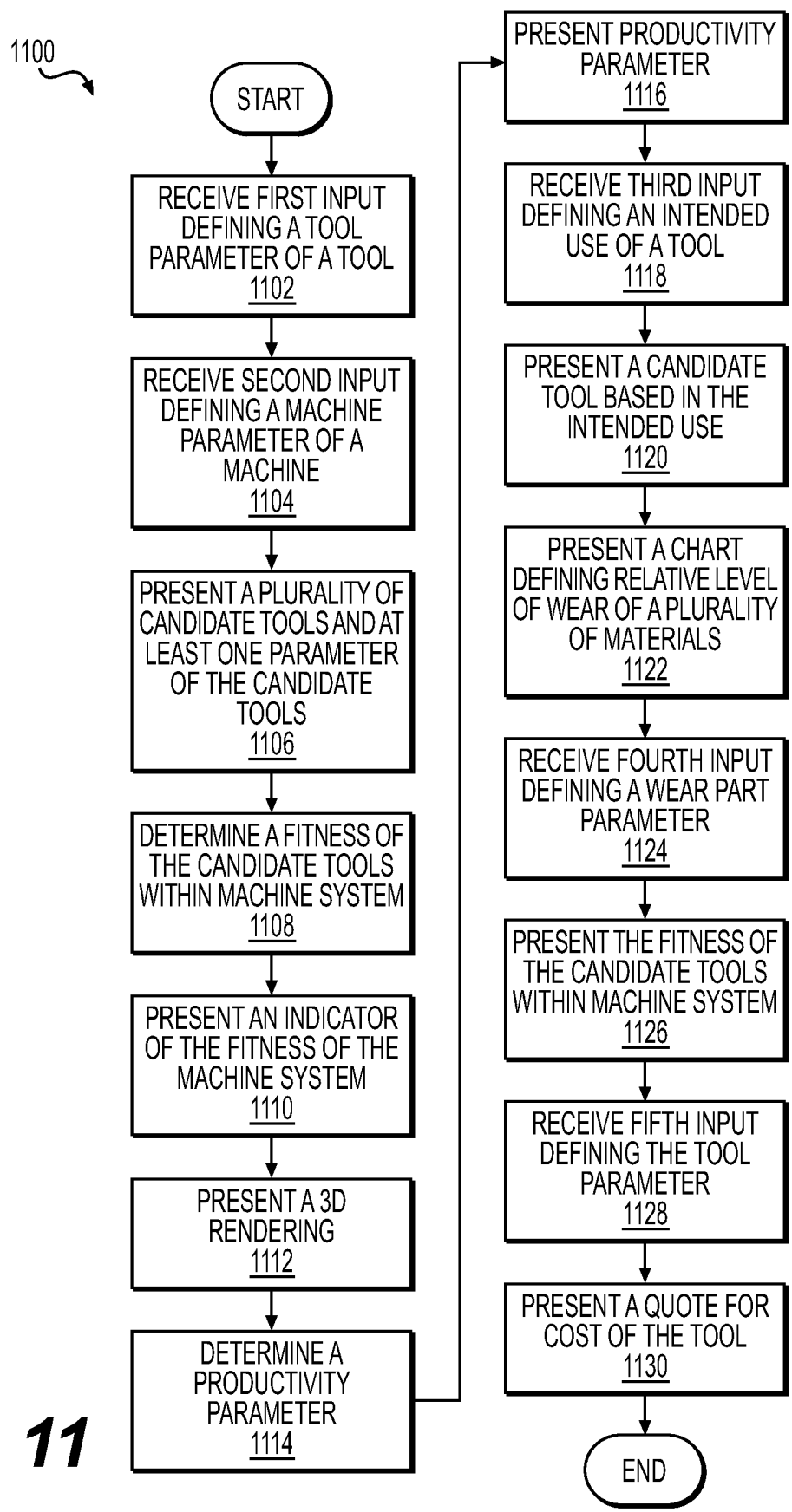
FIG. 11 is a flowchart showing a method of executing a GUI, according to an example of the principles described herein.

FIG. 10 is a flowchart showing a method 1000 of executing a GUI 300, 400, 500, 600, according to an example of the principles described herein. The processes described in connection with FIGS. 10 and 11 are performed by the processor 902 executing the GUI module 920 stored within the data storage device 904. The processor 902 outputs the GUIs 300, 400, 500, 600, 700, 800 as generated by the GUI module 920 to the user. The GUIs 300, 400, 500, 600, 700, 800 are interactive such that the user both receives information from and enters information into the GUIs 300, 400, 500, 600, 700, 800.

The method 1000 of FIG. 10 includes, at 1002, receiving, via a GUI 300, 400, 500, 600, a first input defining a machine. The machine includes, for example, the loading machine 524 and/or the hauling machine 526. At 1004, a second input defining at least one tool parameter of a tool 342 to be coupled to the loading machine 524 is received via the GUI 300, 400, 500, 600. The machine 524 and the tool 342 define a machine system.

The method 1000, also includes, at 1006, determining at least one system parameter of the machine system, and, at 1008, presenting, via the GUI 300, 400, 500, 600, a fitness of the machine system based on the system parameter. For example, the GUI 500 including a truck matching tab 306 provides an indication as to how the tool 342 fits with the loading machine 524 and the bed 528 of the hauling machine by way of, for example, size, height, and relative positioning.

FIG. 11 is a flowchart showing a method 1100 of executing a GUI 300, 400, 500, 600, according to an example of the principles described herein. The method 1100 of FIG. 10 includes, at 1102, receiving, via a GUI 300, 400, 500, 600, a first input defining a tool parameter of the tool 342. The tool parameters include those parameters described herein in connection with the selection interface elements available to the user via GUIs 300, 400, 500, 600.

The method 1100 also includes, at 1104, receiving, via a GUI 300, 400, 500, 600, a second input defining a machine parameter of the machine such as the loading machine 524 and/or the hauling machine 526. In one example, the processes at blocks 1102 and 1104 are performed in any order. The presenting, via the GUI, at least one candidate tool 342 based on the fitness of the candidate tool 342 with the machine system.

At 1104, a second input defining at least one tool parameter of a tool 342 to be coupled to the loading machine 524 is received via the GUI 300, 400, 500, 600. The machine 524 and the tool 342 define a machine system.

The method 1100, also includes, at 1106, presenting, via the GUI 300, 400, 500, 600, at least one candidate tool 342 based on the fitness of the candidate tool 342 with the machine system. The tool candidate list 336 of the GUI 300 of FIG. 3 is presented as a result of block 1106. The tool candidate list 336 includes at least one, and, in some examples, at least two candidate tools 342 to allow the user to preliminarily compare the candidate tools 342. Further, one of the candidate tools 342 is selected via the tool candidate list 336 to present that selected candidate tool 342 in the tool preview window 332 of the GUI 300.

At 1108, the method 1100 includes determining a fitness of at least one of the candidate tools 342 included within the tool candidate list 336 within the machine system which includes the tool 342 and the machine to which the tool is coupled. An indicator is presented at 1110 defining the fitness of the machine system. For example, the machine payload evaluation window 412 and machine swung load evaluation window 418 of the GUI 400 of FIG. 4 and the machine system information window 502 and truck matching selection window 510 of the GUI 500 of FIG. 5 presents information to the user defining the fitness of the tool 342 with the machine system and/or with a secondary machine such as the hauling machine 526.

A three-dimensional (3D) rendering of the tool 342 and/or the machines 524, 526 is presented at 1112 to provide the user with the ability to visually confirm that selections made by the user are added to the tool 342 and will be added in a quote. The tool preview window 332 of the GUI 300 of FIG. 3, the tool preview window 420 of the GUI 400 of FIG. 4, the machine preview window 522 of the GUI 500 of FIG. 5, the tool preview window 640 of the GUI 600 of FIG. 6, and/or the first window 712 and the second window 714 of the GUI 700 of FIG. 7 includes 3D renderings of the tool 342 and/or the machines 524, 526.

At 1114, a productivity parameter of the machine system based on the system parameters are determined, and, at 1116, presenting the productivity parameter to the user. The productivity parameters include any parameter or metric that defines how the tool 342, used in conjunction with the loading machine 524 as well as the hauling machine 526 and the bed 528 result in an efficient movement of material. For example, the metrics provided in the machine system information window 502 and truck matching selection window 510 of the GUI 500 of FIG. 5 provide productivity parameters including, for example, the estimated number of passes the loading machine 524 (with the selected tool 342) takes to fill the bed 528 of the hauling machine 526.

A third input is received at 1118 from the user defining an intended use of the tool. For example, the user enters a selection at the application selection interface element 312 of FIG. 3, among other selection interface elements to define how the user intends to use the tool 342. This information proves helpful in assisting the user filtering the candidate tools 342 included in the tool candidate list 336 or otherwise selecting an appropriate tool 342 for the intended use. At 1120, the method 1100 includes presenting a candidate tool based on the third input defining the intended use. The presentation of the candidate tool 342 is presented in the tool candidate list 336 of FIG. 3.

In one example, the method 1100 includes presenting, via the GUIs 300, 400, 500, 600, a chart in association with a plurality of intended uses of the tool 342 at 1122. The chart visually defines a relative level of wear of a plurality of materials on the tool 342. In one example, a material gradient is displayed that includes a number of materials listed in an order to hardness or abrasiveness on the tool 342.

At 1124, a fourth input is received by the user defining at least one wear part parameter of a wear part (e.g., GETs described herein) to be coupled to the tool 342. In one example, the wear part parameters are input by the user via the selection interface elements of the GET selection tab 304. Based on the inputs by the user defining the wear part parameters, the method 1100 includes determining and presenting to the user a fitness of at least one of the candidate tools 342 included within the tool candidate list 336 within the machine system which includes the tool 342 and the machine to which the tool 342 is coupled. Because the wear parts (GETs) coupled to the tool 342 increases the weight of the tool 342, inputs made via, for example, the GET selection tab 304 prompts for a determination of fitness as similarly performed in connection with 1108 described herein.

The method 1100 also includes receiving, via the tool (e.g., bucket) builder tab 308 of the GUI 600 depicted in FIG. 6, a fifth input defining the tool parameter of a first candidate tool 342 of the plurality of candidate tools listed in, for example, the tool candidate list 336 at 1128. The bucket builder tab 308 allows a user to define parameters of the tool 342 with a higher degree of granularity, and, in some examples, allows the user to build a custom tool 342.

A quote 804 is also presented to the user at 1130 including a cost of the tool 342 as described herein in connection with FIG. 8. Specifically, the quote creation selection 802, when selected by the user, causes the GUIs 300, 400, 500, 600, 700, 800 to generate the quote 804. The user utilizes the quote 804 to then make a purchase of the tool 342.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The components described herein represent instructions that are stored in any type of computer-readable medium and are implemented in software and/or hardware. All of the methods and processes described above are embodied in, and fully automated via, software code components and/or computer-executable instructions executed by one or more computers or processors, hardware, or some combination thereof. Some or all of the methods are alternatively embodied in specialized computer hardware.

Conditional language such as, among others, "may," "could," "may" or "might," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example.

Conjunctive language such as the phrase "at least one of X, Y or Z," unless specifically stated otherwise, is to be understood to present that an item, term, etc. may be either X, Y, or Z, or any combination thereof, including multiples of each element. Unless explicitly described as singular, "a" means singular and plural.

Any routine descriptions, elements or blocks in the flow diagrams described herein and/or depicted in the attached figures should be understood as potentially representing modules, segments, or portions of code that include one or more computer-executable instructions for implementing specific logical functions or elements in the routine. Alternate implementations are included within the scope of the examples described herein in which elements or functions are deleted, or executed out of order from that shown or discussed, including substantially synchronously, in reverse order, with additional operations, or omitting operations, depending on the functionality involved as would be understood by those skilled in the art.

In the examples described herein, a training set of data may be used in a machine learning environment to make determinations including selection of tools 342 to include within the candidate tool list 336 and/or which of the plurality of selections to make within the various interface elements within the tool matching systems and methods described herein. In this example, the training set of data may include historical operations data, information that identifies possible issues in the historical operations data, and/or the like. Additionally, or alternatively, when data is entered into the computing device(s) 108, the tool matching system 120, and/or the dealer computing device(s) 122 of the system 100, the same data may be input into a machine learning model, and machine learning algorithms may use those inputs as a training set of data. Further, a second portion of the input data may be used by the tool matching systems and methods described herein as a validation set of data. Still further, a third portion of the input data may be used by the tool matching systems and methods described herein as a test set of data (e.g., to be used to determine a model included in the first set of models). In one example, the tool matching systems and methods described herein may perform multiple iterations of training of the machine learning model, depending on an outcome of testing of the machine learning model (e.g., by submitting different portions of the operations data as the training set of data, the validation set of data, and the test set of data).

In one example, when training the machine learning model, the tool matching systems and methods described herein may utilize a random forest classifier technique to train the machine learning model. For example, the tool matching systems and methods described herein may utilize a random forest classifier technique to construct multiple decision trees during training and may output a classification of operations data. Additionally, or alternatively, when training the machine learning model, the tool matching systems and methods may utilize a gradient boost tree classifier technique to generate the machine learning model. For example, the tool matching systems and methods may utilize a gradient boost tree classifier technique to generate a prediction model from a set of weak prediction models (e.g., by generating the machine learning model in a stage-wise manner, by optimizing an arbitrary differentiable loss function, and/or the like). In one example, the tool matching systems and methods may use one or more other machine learning techniques in association with training the machine learning model.

In one example, implementations, rather than training a machine learning model, the tool matching systems and methods described herein may receive a machine learning model from another device or system. For example, a server device may generate the machine learning model based on having trained the machine learning model in a manner similar to that described above (and/or by using historical operations data from multiple machines) and may provide the machine learning model to the tool matching systems and methods (e.g., may pre-load the tool matching systems and methods with the machine learning model, may receive a request from the tool matching systems and methods for the machine learning model, and/or the like).

In one example, the machine learning model may indicate which of a number of tools 342 include within the tool data 124 qualify as candidate tools for presentation in the candidate list 336, a number of characteristics of the tools 342, and metrics associated with the tools 342 as coupled to a machine 524, and/or the like. For example, the tool matching systems and methods described herein may input real-time or near real-time operations data into the machine learning model to determine whether the tools 342 are compatible and fit for the intended purpose and/or scenario, and/or the like based on the manner in which the machine learning model was trained.

For example, the machine learning model may output an indication of which of a number of tools 342 include within the tool data 124 qualify as candidate tools for presentation in the candidate list 336, a number of characteristics of the tools 342, and metrics associated with the tools 342 as coupled to a machine 524, whether the tools 342 are compatible and fit for the intended purpose and/or scenario, and/or the like based on the operations data (e.g., based on a trend and/or pattern in the operations data that the machine learning model has been trained to identify), based on operating condition data (e.g., to account for an effect that operating conditions may have on operations of the part), and/or the like. Additionally, or alternatively, the machine learning model may output a recommended operation to be performed with respect to the tools 342, the machine 524, the GETs and other elements of the machine system, as described herein.

In one example, the tool matching systems and methods described herein may identify a machine learning model to use. For example, the tool matching systems and methods may store various machine learning models, and the tool matching systems and methods may identify a particular machine learning model to use to process the operations data. In one example, the tool matching systems and methods may identify a machine learning model based on information related to the tool data 124. For example, different machine learning models may be associated with different types of tools 342, the machine 524, the GETs and other elements of the machine system, different manufacturers of the tools 342, the machine 524, the GETs and other elements of the machine system, different materials from which tools 342, the machine 524, the GETs and other elements of the machine system may be fabricated (e.g., aluminum, steel, plastic, and/or the like), and/or the like.

Additionally, or alternatively, the tool matching systems and methods described herein may identify a machine learning model based on processing that the tool matching systems and methods performed on the operations data. For example, the tool matching systems and methods may select a machine learning model when using operations data to determine a candidate tool 342 but may select a different machine learning model when using derived data to determine the candidate tool 342. Similarly, in some implementations, the tool matching systems and methods may select different machine learning models for different data included in the tool data 124, based on a time period during which the operations data was gathered and/or aggregated, and/or the like.

In one example, the tool matching systems and methods described herein may perform an initial analysis of the operations data prior to selecting a machine learning model. For example, the tool matching systems and methods may analyze a trend, may analyze a pattern, may determine whether the operations data satisfies a threshold during a time period, and/or the like, prior to selecting a machine learning model to use, prior to determining to generate derived data, prior to determining to generate mapped data, and/or the like.

Use of machine learning conserves processing resources by reducing or eliminating a need for the tool matching systems and methods described herein to process the operations data. In addition, the use of machine learning increases an accuracy of processing the operations data utilizing a machine learning model by facilitating selection of a machine learning model that has been specifically trained to identify different aspects of operation of the tools 342, which can improve an accuracy of determining candidate tools 342 based on the parameters thereof and resulting metrics described herein. Further, using a machine learning model facilitates processing of thousands, millions, or more data elements for dozens, hundreds or more parts across dozens, hundreds, or more machines in real-time or near real-time in a manner not previously possible. In the examples of machine learning described herein, the systems and methods described herein may use historical tool selections, wear rates, and/or actual payload data obtained from the field to calculate tool recommendations for the user.

Many variations and modifications may be made to the above-described examples, the elements of which are to be understood as being among other acceptable examples. All such modifications and variations are intended to be included herein within the scope of this disclosure and protected by the following claims.

INDUSTRIAL APPLICABILITY

The present disclosure describes systems and methods for building a tool 342 for a machine such as a loading machine 524, presenting results of user selections to visually confirm the selections, and prepare a quote for a user. Such systems and methods are used to more efficiently provide a quote for a tool to a user by not requiring interactions with other individuals. Further, the user is given more flexibility when building the tool by allowing for a myriad of parameters to be selected by the user. Still further, the GUIs described herein provide the user with information associated with the fitness of the tool for use with a defined application or use, a defined loading machine, and a defined hauling machine, among other fitness matrices. As a result, the systems and methods of the present disclosure provides a more user-friendly and simpler way to obtain a quote relating to a tool and purchase the tool based on that quote.

While aspects of the present disclosure have been particularly shown and described with reference to the examples above, it will be understood by those skilled in the art that various additional examples are contemplated by the modification of the disclosed machines, systems and methods without departing from the spirit and scope of what is disclosed. Such examples should be understood to fall within the scope of the present disclosure as determined based upon the claims and any equivalents thereof.

What is claimed is:

1. A method comprising, with a processor executing computer-readable instructions stored within a memory device:
    displaying, on a display device and via at least one graphical user interface (GUI), a first interface element associated with a machine selection;
    receiving, via the first interface element, a first input comprising an indication of a machine;
    displaying, on the display device and via the at least one GUI, one or more second interface elements associated with tool parameters;
    receiving, via the second interface element, a second input comprising an indication of the tool parameters;
    determining, based at least in part on the machine and the tool parameters, one or more tools for use with the machine, the one or more tools comprising a first tool compatible with the machine, and a second tool compatible with the machine and different from the first tool;
    determining, based at least in part on the machine and the tool parameters, a fitness of a first machine system comprising the first tool and the machine, the fitness of the first machine system defining a first level of compatibility of the first tool with the machine;
    determining, based at least in part on the machine and the tool parameters, a fitness of a second machine system comprising the second tool and the machine, the fitness of the second machine system defining a second level of compatibility of the second tool with the machine; and
    presenting, via the at least one GUI, a graphical representation of the first tool together with:
        a first indicator identifying the fitness of the first machine system,
        a graphical representation of the second tool, and
        a second indicator identifying the fitness of the second machine system.

2. The method of claim 1, wherein determining the one or more tools comprises:
    determining a maximum swung load of the machine;
    determining, based at least in part on the tool parameters, a payload weight;
    determining a tool weight associated with an individual tool of a plurality of candidate tools; and
    determining the one or more tools based at least in part on at least one of the maximum swung load of the machine, the payload weight, and the tool weight,
        the method further comprising presenting, via the at least one GUI and within a list of candidate tools, the one or more tools that meet at least one of the maximum swung load of the machine, the payload weight, and the tool weight,
        wherein the maximum swung load of the machine, the payload weight, and the tool weight are based on a sum of at least a weight of the individual tool of the plurality of candidate tools and the machine.

3. The method of claim 1, further comprising:
    receiving, via the at least one GUI, an additional input indicating an additional tool parameter; and
    updating, in substantially real-time and based on the additional input, at least one of the first indicator and the second indicator.

4. The method of claim 1, further comprising:
    receiving a third input comprising an additional tool parameter;
    identifying, based at least in part on the additional tool parameter, a tool subset of the one or more tools; and
    updating the at least one GUI based at least in part on the tool subset.

5. The method of claim 1, further comprising:
    presenting, via the at least one GUI:
        a plurality of candidate tools in comparison based on a fitness of each candidate tool of the plurality of candidate tools with the machine; and
        the tool parameters of each candidate tool of the plurality of candidate tools in the comparison.

6. The method of claim 1, further comprising, with the processor:
    determining a productivity parameter of the first tool in combination with the machine, the productivity parameter defining a level of efficiency in movement of material; and
    presenting, via the at least one GUI, the productivity parameter,
    wherein the productivity parameter comprises at least one of a tool load capacity of the first tool, a machine load capacity of the machine, a hauling machine load capacity of a hauling machine into which a material is to be loaded via the first tool and the machine, and a number of loading passes of the machine.

7. The method of claim 1, further comprising, with the processor:
    displaying, via the at least one GUI, a third selectable interface element to define at least one intended use of the first tool;
    receiving, via the at least one GUI, a third input corresponding to the at least one intended use of the first tool;
    presenting, via the at least one GUI, at least one candidate tool based on the at least one intended use; and
    presenting, via the at least one GUI, a wear graphical representation in association with a plurality of intended uses of the first tool, the wear graphical representation of the intended uses of the first tool defining a relative level of wear of at least one material of a plurality of materials on the first tool.

8. The method of claim 1, wherein the at least one GUI includes at least one of a tool selection tab to present at least one first selection interface element to define the tool parameters of the first tool of the one or more tools, a wear part selection tab to present at least one second selection interface element to define at least one wear part coupled to the first tool, a machine matching tab to present at least one third selection interface element to define a fitness of the first tool with the machine, and a tool builder tab to present at least one fourth selection interface element to define the tool parameters of the first tool.

9. The method of claim 8, wherein the tool selection tab includes at least one of a model selection menu to present at least one model of the machine, an application menu to present at least one application of the first tool, a material density menu to present at least one material density of a material to be moved by the first tool, a capacity menu to present at least one capacity of the first tool, an attachment type menu to present at least one attachment type of the first tool, a tool edge type menu to present at least one edge type of the first tool, a wear part type menu to present at least one type of the wear part coupled to the first tool, a wear part style menu to present at least one style of the wear part coupled to the first tool, a wear part size menu to present at least one size of the wear part coupled to the first tool, and an adapter strap type menu to present at least one type of adapter strap used to couple the wear part to the first tool.

10. The method of claim 1, further comprising, with the processor:
   determining a quote for a cost of the first tool based on the tool parameters of the first tool; and
   presenting, via the at least one GUI, a quote in response to selection of a quote creation menu option, the quote including the cost and the tool parameters of the first tool.

11. One or more non-transitory computer readable media storing instructions that, when executed by one or more processors, configure a computing device to perform operation comprising:
   receiving a first input defining at least one tool parameter of a first tool to be coupled to a machine;
   receiving a second input defining at least one machine parameter of the machine, the machine and the first tool defining a first machine system;
   determining, based on the at least one tool parameter and the at least one machine parameter, a plurality of candidate tools, the plurality of candidate tools including the first tool and a second tool different from the first tool, the machine and the second tool defining a second machine system;
   presenting, via at least one GUI, the plurality of candidate tools and the at least one tool parameter for each candidate tool of the plurality of candidate tools in comparison;
   determining a fitness of the first machine system, the fitness of the first machine system defining a first level of compatibility of the first tool with the machine;
   determining a fitness of the second machine system, the fitness of the second machine system defining a second level of compatibility of the second tool with the machine;
   presenting, via the at least one GUI, a first indicator identifying the fitness of the first machine system; and
   presenting, via the at least one GUI and together with the first indicator, a second indicator identifying the fitness of the second machine system.

12. The one or more non-transitory computer readable media of claim 11, further comprising computer usable program code to, when executed by the one or more processors:
   present, via the at least one GUI, a three-dimensional rendering of at least one of the machine, at least one of the plurality of candidate tools, the first machine system, and a hauling machine into which a material is to be loaded via the first machine system.

13. The one or more non-transitory computer readable media of claim 11, further comprising computer usable program code to, when executed by the one or more processors:
   determine a productivity parameter of the first machine system based on the at least one tool parameter and the at least one machine parameter, the productivity parameter defining a level of efficiency in movement of material; and
   present, via the at least one GUI, the productivity parameter along a length of an efficiency scale.

14. The one or more non-transitory computer readable media of claim 11, further comprising computer usable program code to, when executed by the one or more processors:
   receive, via the at least one GUI, a third input defining at least one intended use of the first tool; and
   determine the fitness of the first machine system based on the first input, the second input, and the at least one intended use of the first tool.

15. The one or more non-transitory computer readable media of claim 11, further comprising computer usable program code to, when executed by the one or more processors:
   present, via the at least one GUI, a graphical representation in association with a plurality of intended uses of the first tool, the graphical representation defining a relative level of wear of at least one material of a plurality of materials on the first tool.

16. The one or more non-transitory computer readable media of claim 11, further comprising computer usable program code to, when executed by the one or more processors:
   receive a fourth input defining at least one wear part parameter of a wear part to be coupled to the first tool, and
   wherein the determining of the plurality of candidate tools is further based on the at least one wear part parameter.

17. A system, comprising:
   a processor; and
   a data storage device communicatively coupled to the processor to store computer usable program code to, when executed by the processor:
      present at least one graphical user interface (GUI) including a tool selection tab to present at least one first selection interface element to define at least one tool parameter of a first tool, a wear part selection tab to present at least one second selection interface element to define at least one wear part coupled to the first tool, and a machine matching tab to present additional information associated with at least the first tool and a machine with which the first tool is compatible;
      receive, via the tool selection tab, a first input defining at least one tool parameter of the first tool;
      receive, via the tool selection tab, a second input defining at least one machine parameter of the machine, the machine and the first tool defining a first machine system;
      receive, via the wear part selection tab, a third input defining at least one wear part parameter of a wear part to be coupled to the first tool;
      present, via the machine matching tab,
         a first indicator identifying a fitness of the first machine system,
            the fitness of the first machine system defining a first level of compatibility of the first tool with the machine, and
         a second indicator identifying a fitness of a second machine system,
            the second machine system comprising a second tool, different from the first tool, and the machine, and
            the fitness of the second machine system defining a second level of compatibility of the second tool with the machine; and
      present, via the at least one GUI and together with the first indicator and the second indicator, a plurality of candidate tools based on the first input, the second input, and the third input.

18. The system of claim 17, wherein the at least one GUI is presented by the processor over a network to a user.

19. The system of claim 17, wherein the computer usable program code, when executed by the processor:

determines a quote for a cost of the first tool based on the at least one tool parameter; and presents, via the at least one GUI, the quote for the cost for the first tool including the at least one tool parameter in response to selection of a quote creation menu option.

20. The system of claim 17, wherein the computer usable program code, when executed by the processor:

determines a productivity parameter of the first machine system based on the tool parameter and the machine parameter, the productivity parameter defining a level of efficiency in movement of material; and presents, via the at least one GUI, the productivity parameter.

* * * * *